US012480214B2

(12) United States Patent
Sandhage

(10) Patent No.: US 12,480,214 B2
(45) Date of Patent: Nov. 25, 2025

(54) METHODS AND MATERIALS SYSTEMS FOR ENHANCING CORROSION RESISTANCE OF SOLID MATERIALS AND CORROSION RESISTANT DEVICES MADE THEREFROM

(71) Applicant: Purdue Research Foundation, West Lafayette, IN (US)

(72) Inventor: Kenneth H. Sandhage, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 942 days.

(21) Appl. No.: 16/494,922

(22) PCT Filed: Mar. 16, 2018

(86) PCT No.: PCT/US2018/022860
§ 371 (c)(1),
(2) Date: Sep. 17, 2019

(87) PCT Pub. No.: WO2018/175233
PCT Pub. Date: Sep. 27, 2018

(65) Prior Publication Data
US 2020/0010958 A1    Jan. 9, 2020

Related U.S. Application Data

(60) Provisional application No. 62/473,405, filed on Mar. 19, 2017.

(51) Int. Cl.
C23F 11/00    (2006.01)
C22C 29/12    (2006.01)
(Continued)

(52) U.S. Cl.
CPC .............. *C23C 22/70* (2013.01); *C22C 29/12* (2013.01); *C23C 22/83* (2013.01); *C23F 15/00* (2013.01)

(58) Field of Classification Search
None
See application file for complete search history.

(56) References Cited

U.S. PATENT DOCUMENTS 4,308,115 A * 12/1981 Foster, Jr. ............... C04B 41/87
                                                  205/384
4,448,611 A    5/1984 Grellet et al.
(Continued)

FOREIGN PATENT DOCUMENTS

CN    106590547 A *  4/2017 ............... C09K 5/12
EP       1413638       4/2004
WO    WO-8300171 A1 *  1/1983

OTHER PUBLICATIONS

International Search Report and Written Opinion for International Application Serial No. PCT/US2018/038005, dated Sep. 28, 2018, 11 pages.
(Continued)

*Primary Examiner* — David P Turocy
(74) *Attorney, Agent, or Firm* — Hartman Global IP Law; Gary M. Hartman; Domenica N.S. Hartman

(57) ABSTRACT

A method for enhancing corrosion resistance of a solid material exposed to a liquid. The method includes providing a solid material which can form a solid product layer when exposed to the corrosive liquid, and maintaining the concentration of the solid product material in the liquid either at saturation or elevated level. A materials system containing a solid material capable of forming a solid product layer when exposed to air or a liquid environment containing dissolved oxygen at levels sufficient for oxidation of at least one constituent of the solid material, wherein the solid product layer is in contact with a liquid containing an elevated or saturated concentration of the dissolved solid product layer. A corrosion-resistant device containing a solid material with a solid-product layer exposed to a molten salt solution, (Continued)

wherein the concentration of the solid-product dissolved in the molten salt solution is at saturation or elevated level.

16 Claims, 16 Drawing Sheets

(51) Int. Cl.
  *C23C 22/70* (2006.01)
  *C23C 22/83* (2006.01)
  *C23F 15/00* (2006.01)

(56) References Cited

U.S. PATENT DOCUMENTS

| | | | |
|---|---|---|---|
| 4,659,629 A | | 4/1987 | Gartner et al. |
| 5,348,689 A | | 9/1994 | Gay et al. |
| 5,378,325 A | * | 1/1995 | Dastolfo, Jr. ............. C25C 3/12 |
| | | | 205/369 |
| 5,769,966 A | | 6/1998 | Park |
| 7,682,967 B2 | | 3/2010 | Kim et al. |
| 8,324,976 B2 | | 12/2012 | Borghetti et al. |
| 2001/0019017 A1 | * | 9/2001 | Duruz ....................... C25C 3/06 |
| | | | 204/243.1 |
| 2012/0104346 A1 | | 5/2012 | Yi et al. |
| 2013/0026434 A1 | | 1/2013 | Yang et al. |
| 2013/0320286 A1 | | 12/2013 | Lee et al. |

OTHER PUBLICATIONS

International Search Report for International Application Serial No. PCT/US2018/022860, dated Jul. 26, 2018, (4 pages).

* cited by examiner

Solid Cr₂O₃ layer

Solid chromium-bearing material

Molten NaCl-KCl-based salt
(Saturated with $Cr_2O_3$, or containing an elevated concentration of dissolved $Cr_2O_3$)

Solid Al$_2$O$_3$ layer

Solid aluminium-bearing material

Molten CaCl$_2$-NaCl-based salt (Saturated with Al$_2$O$_3$, or containing an elevated concentration of dissolved Al$_2$O$_3$)

METHODS AND MATERIALS SYSTEMS FOR ENHANCING CORROSION RESISTANCE OF SOLID MATERIALS AND CORROSION RESISTANT DEVICES MADE THEREFROM

CROSS-REFERENCE TO RELATED APPLICATIONS

The present U.S. patent application is a 35 U.S.C. § 371 national phase application of PCT/US2018/022860, filed Mar. 16, 2018, which is related to and claims the priority benefit of U.S. Provisional Patent Application Ser. No. 62/473,405, filed Mar. 19, 2017, the contents of which are incorporated in their entirety herein by reference.

TECHNICAL FIELD

This disclosure generally relates to methods and materials systems for achieving corrosion resistance of metals, metallic alloys, metal-bearing composites, ceramics, and ceramic-bearing composites in high-temperature corrosive liquid environments. This disclosure also relates corrosion-resistant devices made utilizing the methods and materials systems of this disclosure.

BACKGROUND

This section introduces aspects that may help facilitate a better understanding of the disclosure. Accordingly, these statements are to be read in this light and are not to be understood as admissions about what is or is not prior art.

Molten salts can possess attractive characteristics for use as high-temperature heat transfer liquids and as high-temperature thermal storage liquids. Such attractive characteristics include chemical stability at high temperatures, modest melting points, low vapor pressures at high temperatures (i.e., high boiling points), modest densities, modest values of viscosity at high temperatures, and high heat capacities per unit volume.

During use as high-temperature heat transfer liquids and high-temperature thermal storage liquids, molten salts come into contact with a number of solid materials, such as solid materials used for containment of the molten salt (e.g., materials in pipes and tanks), solid materials present in devices used to control the flow of such molten salts (e.g., pumps, valves), and materials used to transfer heat into or out of such molten salts (e.g., heaters, chillers, heat exchangers). In order to allow for prolonged, cost-effective use of molten salts as high-temperature heat transfer liquids and high-temperature thermal storage liquids, the solid materials being exposed to such molten salts need to be resistant to corrosion by such molten salts at high temperatures. However, such molten salts tend to be corrosive to solid materials, including solid metals, metal alloys, metal-bearing composites, ceramics, and ceramic-bearing composites. Such corrosion includes, but is not limited to, dissolution of one or more components of the solid material into the molten salt, oxidation of one or more components of the solid material by the molten salt, penetration of the solid material by the molten salt, or combinations thereof. Such corrosion of the solid material by the molten salt can degrade desired properties of the solid material, with such properties including, but not limited to, mechanical and thermal properties.

Existing methods to improve the corrosion resistance of solid materials in molten salts include generating environments (such as by use of an oxygen-gettering agent and/or a water-gettering agent) in which the oxygen levels and/or water levels are diminished near the contact area between the corrosive molten salt and the solid material, thereby preventing or reducing corrosion of the solid. However, such methods are complex and not very effective due to leaks in the system that allow oxygen and/or water to enter the oxidation prone area. Further, the oxygen and/or water levels need to be monitored to assure low oxygen and/or water levels leading to a cost associated with such monitoring.

Thus there is an unmet need for a method of improving the corrosion resistance of solid materials in contact with molten salts without requiring the complexity and cost of achieving a low oxygen content and/or low water content and without requiring the complexity and cost of monitoring the oxygen content and/or water content in the area of the contact.

SUMMARY

A method for enhancing corrosion resistance of a solid material exposed to a liquid is disclosed, The method includes providing a solid material whose corrosion resistance to a liquid is desired to be enhanced and which is capable of forming a solid product layer when exposed to the liquid containing chemical elements needed to react with the solid material to form the solid product layer, and maintaining the concentration of the solid product material in the liquid either at saturation level or at an elevated level.

In the above method many variations are possible for the solid material, solid product layer and the liquid. In particular the solid material can be metallic or non-metallic and the solid product layer will depend on the solid material. The liquid, the corrosion resistance to which is desired to be enhanced, can be a molten salt and many variations of the compositions of the molten salt are possible. Non-limiting variations of the molten salts are described in the disclosure.

A materials system is disclosed. The materials system contains a solid material capable of forming a solid product layer when exposed to air or a liquid environment containing dissolved oxygen at levels sufficient for oxidation of at least one constituent of the solid material, wherein the solid product layer is in contact with a liquid containing an elevated or saturated concentration of the dissolved solid product layer.

For the above materials system many variations are possible for the solid material, solid product layer and the liquid. In particular the solid material can be metallic or non-metallic and the solid product layer will depend on the solid material. The liquid can be a molten salt and many variations of the compositions of the molten salt are possible. Non-limiting variations of the molten salts are described in the disclosure A corrosion-resistant device is disclosed. The corrosion-resistant device includes a solid material comprising a solid-product layer exposed to a molten salt solution, wherein the concentration of the solid-product dissolved in the molten salt solution is at saturation or at an elevated level.

For the above corrosion-resistant device, many variations are possible for the solid material, solid product layer and the liquid. In particular the solid material can be metallic or non-metallic and the solid product layer will depend on the solid material. The liquid can be a molten salt and many variations of the compositions of the molten salt are possible. Non-limiting variations of the molten salts are described in the disclosure.

It should also be recognized that for the methods, materials systems, and the corrosion-resistant devices of this disclosure, many process conditions are possible depending on the materials involved and the details of such variations are described in detail in this disclosure.

BRIEF DESCRIPTION OF DRAWINGS

Some of the figures shown herein may include dimensions. Further, some of the figures shown herein may have been created from scaled drawings or from photographs that are scalable. It is understood that such dimensions or the relative scaling within a figure are by way of example, and not to be construed as limiting. Further, in this disclosure, the figures shown for illustrative purposes are not to scale and those skilled in the art can readily recognize the relative dimensions of the different segments of the drawings depending on how the principles of the disclosure are used in practical applications.

DETAILED DESCRIPTION

Figure 1:
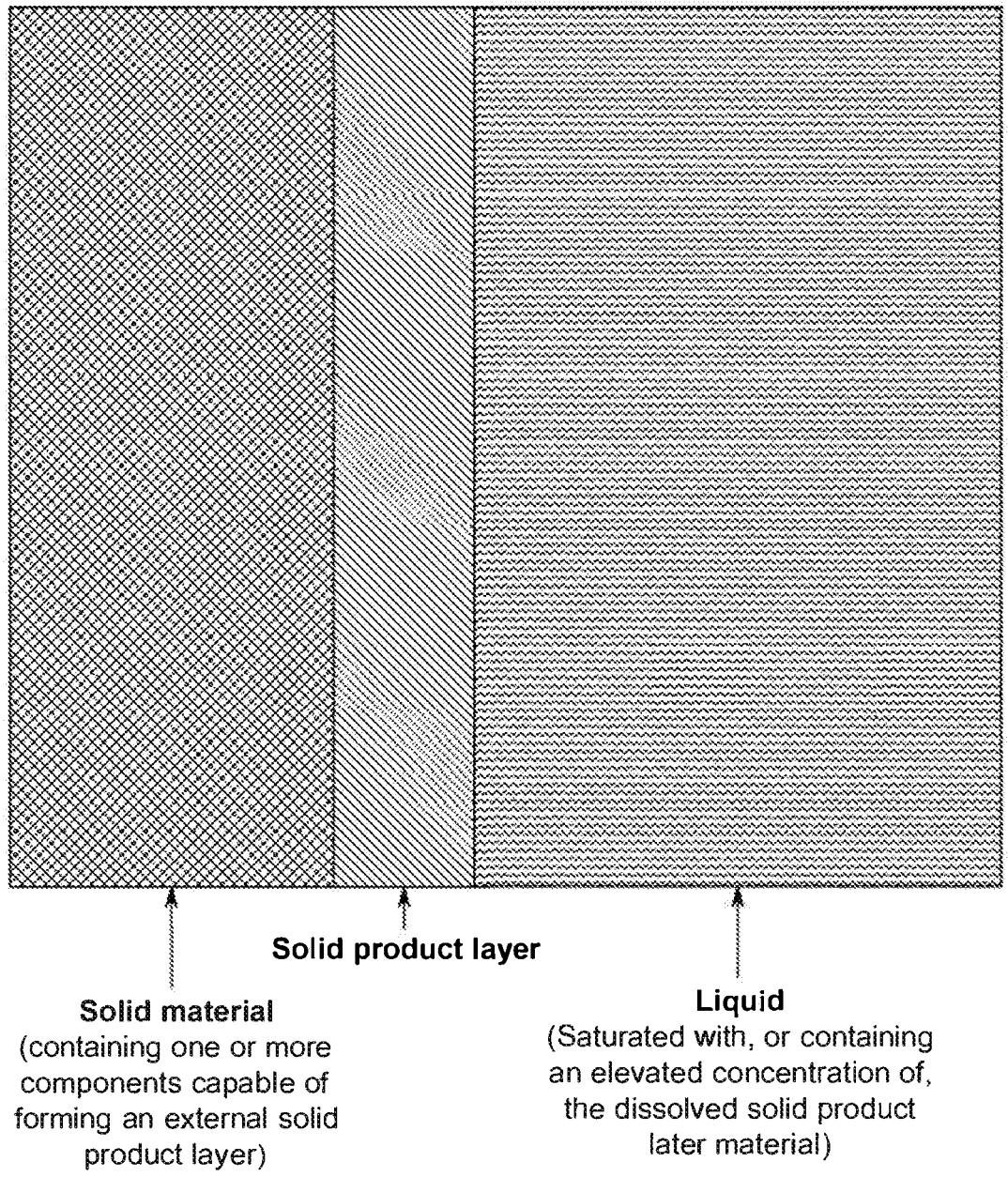
FIG. 1 is Schematic illustration of a key general concept of this disclosure.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended, such alterations and further modifications in the illustrated device, and such further applications of the principles of the disclosure as illustrated therein being contemplated as would normally occur to one skilled in the art to which the disclosure relates.

The present disclosure relates to methods for achieving corrosion resistance of metals, metallic alloys, metal-bearing composites, ceramics, and ceramic-bearing composites in high-temperature corrosive liquid environments. The present disclosure also relates to methods for achieving the corrosion resistance of mechanically-robust metals such as but not limited to metallic alloys, metal-bearing composites, ceramics, and ceramic-bearing composites in high-temperature corrosive liquid environments. The present disclosure also relates to methods for achieving the corrosion resistance of thermally-conductive metals such as but not limited to metallic alloys, metal-bearing composites, ceramics, and ceramic-bearing composites in high-temperature corrosive liquid environments. The present disclosure particularly relates to methods for achieving the corrosion resistance of metals, metallic alloys, metal-bearing composites, ceramics, and ceramic-bearing composites in high-temperature corrosive liquid environment. It should be noted that the corrosive liquid environment can include a molten salt, where the molten salt includes, but is not limited to any one of the following materials or any combinations of the following materials: a chloride-bearing liquid, a fluoride-bearing liquid, a nitrate-bearing liquid, a sulfate-bearing liquid, a carbonate-bearing liquid, and a hydroxide-bearing liquid, The present disclosure also relates to solid materials and liquid materials used to achieve corrosion resistance of metals, metallic alloys, metal-bearing composites, ceramics, and ceramic-bearing composites in high-temperature corrosive liquid environments. The present disclosure particularly relates to mechanically robust solid materials and liquid materials used to achieve the corrosion resistance of metals, metallic alloys, metal-bearing composites, ceramics, and ceramic-bearing composites in high-temperature corrosive liquid environments. The present disclosure particularly relates to thermally conductive solid materials and liquid materials used to achieve the corrosion resistance of metals, metallic alloys, metal-bearing composites, ceramics, and ceramic-bearing composites in high-temperature corrosive liquid environments. The present disclosure also relates to a system of solid materials and liquid materials used to achieve the corrosion resistance of metals, metallic alloys, metal-bearing composites, ceramics, and ceramic-bearing composites in high-temperature corrosive liquid environments. It should be noted that the corrosive liquid environment can include a molten salt, where the molten salt includes, but is not limited to any one of the following materials or any combinations of the following materials: a chloride-bearing liquid, a fluoride-bearing liquid, a nitrate-bearing liquid, a sulfate-bearing liquid, and a hydroxide-bearing liquid.

The present disclosure also provides methods for achieving the corrosion resistance of solid metals, metallic alloys, metal-bearing composites, ceramics, and ceramic-bearing composites in high-temperature corrosive liquid environments for use in components in high-temperature systems. Examples of such high-temperature systems include, but are not limited to, systems for transportation, energy (e.g., electrical power) production, energy storage, waste heat recovery, propulsion, national defense, chemical processing, and chemical and waste storage. Examples of transportation systems in the context of this disclosure include, but are not limited to, systems for automobiles, trucks, trains, aircraft, spacecraft, ships, and submarines. Examples of electrical power production systems in the context of this disclosure include, but are not limited to, systems for fossil fuel-derived power, solar energy-derived power, nuclear energy-derived power, and thermionics. Solar energy-derived power production systems in the context of this disclosure include but not limited to concentrating solar power production systems. Energy storage systems in the context of this disclosure include, but are not limited to, systems for the storage of solids, liquids, gases, or plasmas. Examples of propulsion systems in the context of this disclosure include, but are not limited to, systems for chemical fuel-based propulsion, nuclear fuel-based propulsion, and ion propulsion. Examples of national defense systems in the context of this disclosure include, but are not limited to, systems for hypersonic aircraft and hypersonic missiles. Components in the context of this disclosure suitable for use in such high temperature systems include, but are not limited to, heat exchangers, piping, valves, storage containers for high-temperature solids and liquids, pumps, bearings, heat sinks, liquid metal handling equipment, engine components (such as turbine blades, pistons, compressors, combustion chambers), leading edges of hypersonic aircraft and missiles, and energy conversion devices. Examples of high-temperature corrosive liquid environments in the context of this disclosure include, but are not limited to, environments comprising a high-temperature molten salt.

In this disclosure, the term "solid material" is used to denote the material whose corrosion resistance to a liquid is desired to be enhanced. The term "solid product material", in the context of this disclosure denotes the corrosion product formed due to the interaction of the solid material with an atmosphere and/or with the liquid. It should be noted that in certain situations, the solid material in contact with a liquid may itself be a solid product material formed previously and corrosion resistance in such a case implies eliminating or diminishing further dissolution of the solid product material into the liquid or an undesirable chemical reaction with the liquid. The rate of corrosion of a solid material in contact with a corrosive liquid may be significantly reduced by introducing into such a corrosive liquid one or more products of one or more corrosion reactions between the liquid and the solid. FIG. 1 is a schematic illustration of a concept of this disclosure. Referring to FIG. 1, a cross section of a solid material containing one or more components is provided, wherein the solid material comprises a solid-product layer, also shown in cross section. This solid product layer can also be referred to as a scale. One non-limiting example of such a solid-product layer or scale is an oxide comprising the solid material. It should be noted that oxide layers are more typical than other solid products. Referring to FIG. 1 again, a liquid is shown (also as a cross section) to be in contact with the solid product layer or scale. This liquid either is saturated with or contains an elevated level of the solid product material dissolved in it. In the context of this disclosure, an elevated level of the corrosion product in the corrosive liquid is to be understood to be a level of concentration of the corrosion product in the corrosion liquid, at which the corrosion rate is reduced by at least 10% compared to the corrosion rate when the corrosive liquid has zero or near-zero concentration of the corrosion product in the corrosive liquid. Near-zero, for purposes of this disclosure can be taken to be <1%. This elevated level is understandably dependent on the materials system under consideration and the ambient conditions, notably, temperature. It is expected that in several systems, about 1% level of the solid product material in the liquid can diminish the rate of dissolution of the solid product layer present on the surface of the solid material. Since the liquid is saturated with or contains elevated levels of the solid product material, the propensity for any further dissolution of the solid product material into the liquid is eliminated or is greatly diminished. This is due to the elimination or reduction of the thermodynamic driving force for the dissolution mechanisms. It should be noted that in the event a driving force exists due to elevated levels only approaching saturation without achieving saturation, the rate of dissolution is greatly reduced since the driving force is smaller, thus keeping the scale described above intact or nearly intact. This scale thus protects the solid material shown in FIG. 1 from being corroded by the liquid, which in many applications described above is corrosive. If the dissolved content of the solid product in the liquid is well below saturation, then some dissolution of the scale can occur. As mentioned above, in FIG. 1, the solid material is shown to comprise a solid-product layer or scale. It should be recognized that such a scale can be formed in many different ways. One non-limiting way the scale can be achieved on the solid material is by oxidation of the desired surface or surfaces of the solid material by exposure to a suitable gaseous atmosphere in a temperature range. Such suitable gaseous atmospheres depend on the nature of the solid material and the solid product material. As a non-limiting example, the solid material can be chromium and the solid product chromium oxide $Cr_2O_3$ can be formed in an atmosphere containing an oxygen partial pressure in excess of $3.1 \times 10^{-31}$ atmospheres at a temperature of 727° C. Another non-limiting way the scale can be formed is by exposure of the solid material to the liquid itself if the liquid contains adequate amount of oxygen and/or water. It should be noted that adequate amounts of oxygen or water can be infiltrated into the liquid with the express purpose of causing the scale to form or increasing the amount of the scale. The requirement is that the solid material contains the solid product (scale) before it comes into contact with the corrosive liquid or a scale is formed (or the existing scale is enhanced in thickness) when the solid material comes into contact with the liquid which is either saturated with the solid product material or contains elevated levels of the solid product material.

The following description provides specific examples of the above general concepts of this disclosure with reference to several solid materials, alloys, solid products and liquids. These are merely exemplary embodiments and are not intended to limit the scope of this disclosure. In this disclosure the term metal is intended to include an alloy of the metal. For example the term Ni includes metallic nickel as well as nickel-bearing alloys.

The rate of corrosion of a solid material in contact with a corrosive liquid in a given gaseous environment may be significantly reduced by introducing into such a corrosive liquid one or more products of one or more corrosion reactions between the liquid and the solid or between the solid and a suitable gaseous atmosphere. Thus an aspect of the disclosure is a materials system which comprises a combination of a solid material capable of forming a solid product layer (via exposure to an oxygen-containing and/or water containing environment, such as air or a molten salt with a sufficient amount of dissolved oxygen and/or water) in contact with a molten salt containing an elevated or saturated concentration of the dissolved solid product layer.

Figure 2:
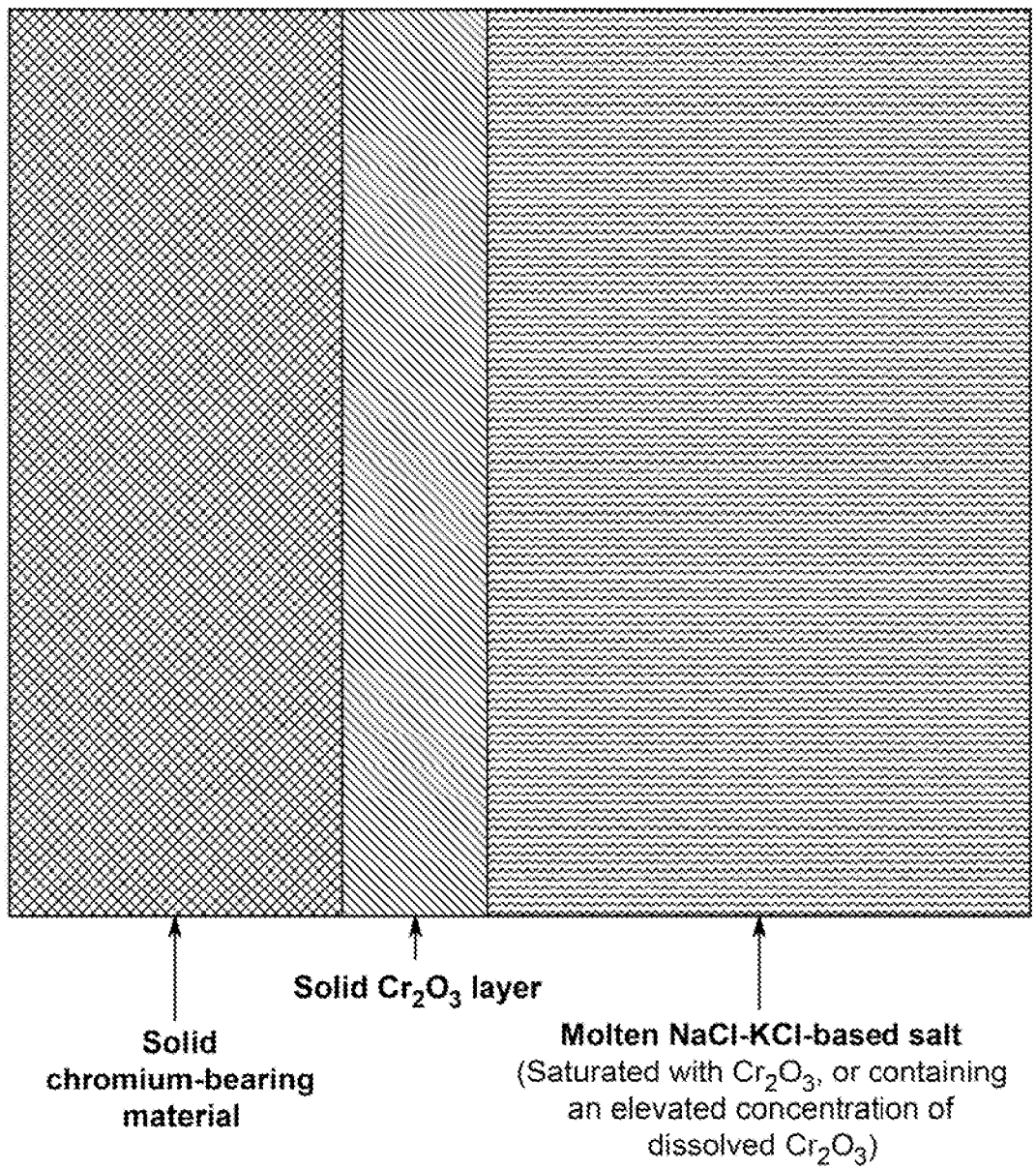
FIG. 2 is a schematic illustration of an example of this disclosure containing a solid chromium-bearing material exposed to a molten NaCl-KCl salt environment.

FIG. 2 is a schematic illustration of an example of this disclosure containing a solid chromium-bearing material exposed to a molten NaCl-KCl salt environment. Referring to FIG. 2, a solid chromium-bearing material has a solid external $Cr_2O_3$ layer or scale such that the scale is in contact with a molten NaCl-KCl-based salt saturated with $Cr_2O_3$, or containing an elevated concentration of dissolved $Cr_2O_3$. In FIG. 2, the bold vertical lines are used to denote the interfaces between a solid material and a solid product layer or between a solid product layer and a liquid. The solid $Cr_2O_3$ layer can be formed upon exposure of the Cr-bearing solid material to a suitable gaseous atmosphere and/or to $Cr_2O_3$-saturated or $Cr_2O_3$-enriched molten NaCl-KCl salt, provided the molten salt contains an adequate amount of oxygen and/or water to create the $Cr_2O_3$ layer. The chromium or a chromium-bearing metallic alloy (such as a nickel-based chromium-bearing alloy that can be, but is not limited to, Haynes 230 or Hastelloy C276 or Hastelloy C22 or Inconel 740H; or an iron-based chromium-bearing alloy such as, but not limited to, a stainless steel alloy such as 304 stainless steel or 316 stainless steel or a cobalt-based chromium-bearing alloy) or a chromium-bearing composite is capable of forming an external $Cr_2O_3$ scale upon exposure to air at 727° C., with this $Cr_2O_3$ scale exhibiting a thickening rate that decreases with increasing time of exposure to air at 727° C. Consider further that this chromium or chromium-bearing metallic alloy or chromium-bearing composite is exposed to a molten salt, containing a mixture of NaCl and KCl (such as an equimolar mixture of NaCl and KCl), at 727° C. in air. If the chromium or chromium-bearing metallic alloy or chromium-bearing composite is pre-oxidized in air and/or water vapor at 727° C. to form an external $Cr_2O_3$ scale, or if the chromium or chromium-bearing metallic alloy or chromium-bearing composite initially forms an external $Cr_2O_3$ scale upon exposure to the NaCl-KCl molten salt at 727° C. in an air and/or water vapor environment, then the $Cr_2O_3$ scale present on the chromium or chromium-bearing alloy or chromium-bearing composite will also dissolve into the NaCl-KCl molten salt at 727° C. if the NaCl-KCl salt is not saturated with $Cr_2O_3$. Such dissolution of $Cr_2O_3$ in the molten NaCl-KCl salt will result in a thinning of the $Cr_2O_3$ scale present on the chromium surface or chromium-bearing metallic alloy surface or chromium-bearing composite surface which, in turn, will require an enhanced rate of oxidation of the chromium or the chromium in the chromium-bearing metallic alloy or the chromium in the chromium-bearing composite (relative to rate of oxidation of chromium or the chromium-bearing metallic alloy or the chromium-bearing composite in air in the absence of the salt) in order to maintain a continuous $Cr_2O_3$ scale of the same thickness on the chromium surface or the chromium-bearing metal alloy surface or the chromium-bearing composite surface. Such an enhanced rate of oxidation of chromium will enhance the rate of consumption of chromium or chromium in the chromium-bearing alloy or chromium in the chromium-bearing composite and result in an undesired increase in the rate of corrosion of the chromium or chromium-bearing alloy or chromium-bearing composite. Such enhanced oxidation of chromium or chromium in the metallic alloy or chromium in the chromium-bearing alloy or chromium-bearing composite upon exposure to the molten NaCl-KCl salt at 727° C. in air can be significantly reduced if the molten NaCl-KCl salt is doped with $Cr_2O_3$ prior to exposure of the chromium or chromium-bearing alloy or chromium-bearing composite to this salt. It has been reported that the solubility of $Cr_2O_3$ in a molten NaCl-KCl salt at 727° C. is less than 1 weight % (wt %). Hence, exposure of chromium or chromium-bearing metal alloy or a chromium-bearing composite in air to a molten NaCl-KCl salt that has been saturated with $Cr_2O_3$ (at a $Cr_2O_3$ concentration near 1 wt %) at 727° C. will allow for the formation of a $Cr_2O_3$ scale on chromium or on the chromium-bearing metallic alloy or on the chromium-bearing composite without the subsequent dissolution of this $Cr_2O_3$ scale in the $Cr_2O_3$-saturated NaCl-KCl salt. That is, the corrosion rate of chromium or a chromium-bearing metallic alloy or a chromium-bearing composite (coated with a $Cr_2O_3$ scale) in the molten NaCl-KCl salt at 727° C. in air will be significantly reduced if the molten NaCl-KCl salt is saturated with a modest (<1 wt %) $Cr_2O_3$ addition. Such a low $Cr_2O_3$ addition to the molten NaCl-KCl salt is also not expected to result in a significant change in the desired thermal properties (e.g., heat capacity, density, viscosity, thermal stability) of the salt for use as a heat transfer fluid or as a thermal storage fluid. Hence, a key aspect of the present disclosure is to provide a molten salt (such as a molten NaCl-KCl salt) at high temperatures (such as at 727° C.) and high oxygen partial pressures (such as air), with the molten salt possessing a dissolved concentration (up to the saturation concentration) of a corrosion product (such as dissolved $Cr_2O_3$), so as to dramatically lower the rate of corrosion of a metal (such as chromium) or a metallic alloy (such as a chromium-bearing alloy that is capable of forming an external $Cr_2O_3$ scale) or a metal-bearing composite (such as a chromium-bearing composite that is capable of forming an external $Cr_2O_3$ scale) exposed to such a molten salt.

Figure 3:
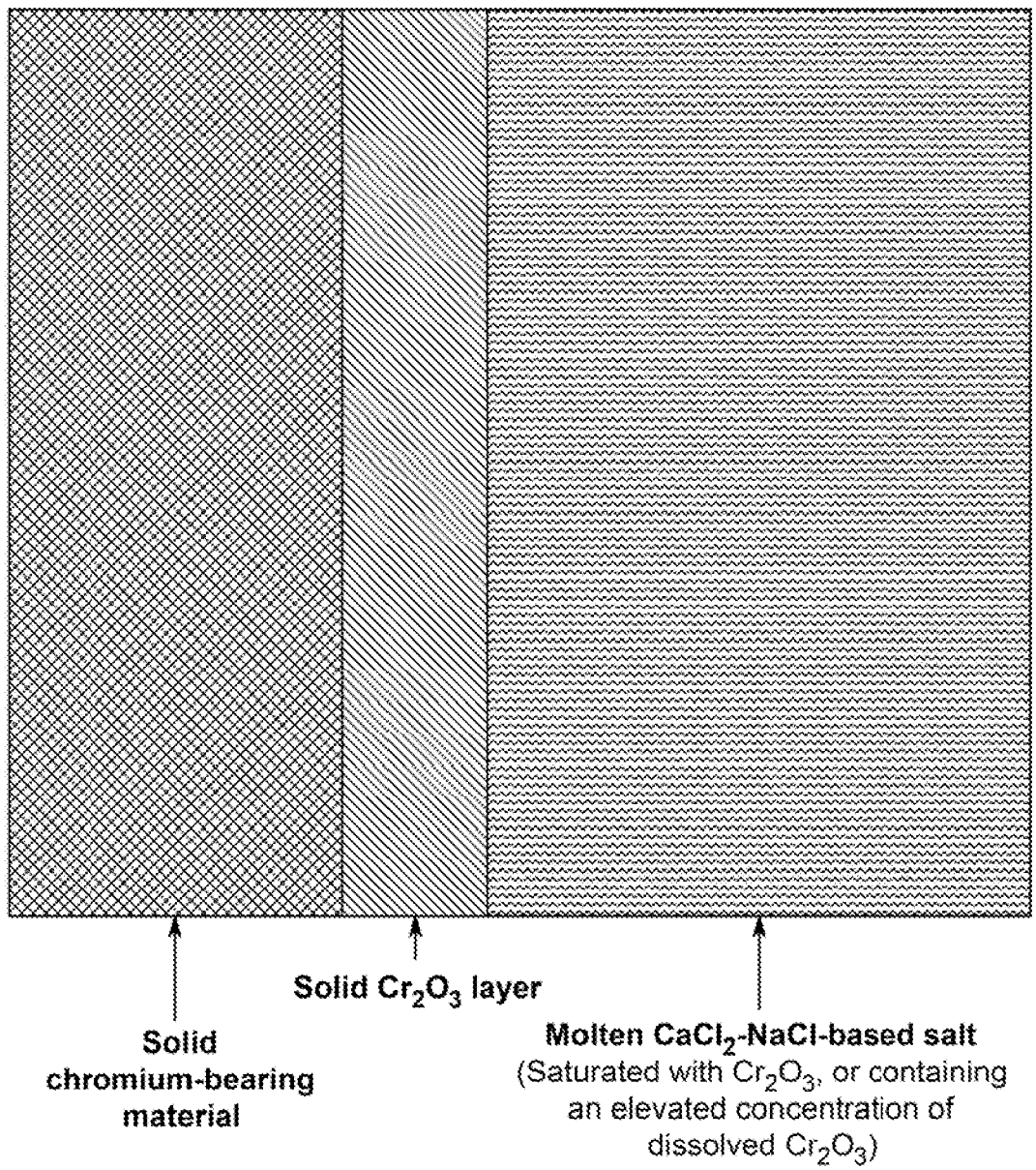
FIG. 3 is a schematic illustration of an example of this disclosure containing a solid chromium-bearing material exposed to a molten $CaCl_2$-NaCl salt environment.

FIG. 3 is a schematic illustration of an example of this disclosure containing a solid chromium-bearing material exposed to a molten $CaCl_2$-NaCl salt environment. Referring to FIG. 3, a solid chromium-bearing material has solid $Cr_2O_3$ layer or scale such that the scale is in contact with a molten $CaCl_2$-NaCl salt saturated with $Cr_2O_3$, or containing an elevated concentration of dissolved $Cr_2O_3$. In FIG. 3, the bold vertical lines are used to denote the interfaces between a solid material and a solid product layer or between a solid product layer and a liquid. The solid $Cr_2O_3$ layer can be formed upon exposure of the Cr-bearing solid material to a suitable gaseous atmosphere and/or to $Cr_2O_3$-saturated or $Cr_2O_3$-enriched molten $CaCl_2$-NaCl salt, provided the molten salt contains an adequate amount of oxygen and/or water to create the $Cr_2O_3$ layer. Consider that this chromium or chromium-bearing metallic alloy or chromium-bearing composite is exposed to a molten salt, containing $CaCl_2$ and NaCl (such as a liquid solution containing 48 mole % $CaCl_2$ and 52 mole % NaCl), at 750° C. in air. If the chromium or chromium-bearing metallic alloy or chromium-bearing composite is pre-oxidized in air at 750° C. to form an external $Cr_2O_3$ scale, or if the chromium or chromium-bearing metallic alloy or chromium-bearing composite initially forms an external $Cr_2O_3$ scale upon exposure to the $CaCl_2$-NaCl molten salt at 750° C. in an air environment, then the $Cr_2O_3$ scale present on the chromium or chromium-bearing alloy or chromium-bearing composite will also dissolve into the $CaCl_2$-NaCl molten salt at 750° C. if the $CaCl_2$-NaCl salt is not saturated with $Cr_2O_3$. Such dissolution of $Cr_2O_3$ in the molten $CaCl_2$-NaCl salt will result in a thinning of the $Cr_2O_3$ scale present on the chromium surface or chromium-bearing metallic alloy surface or chromium-bearing composite surface which, in turn, will require an enhanced rate of oxidation of the chromium or the chromium in the chromium-bearing metallic alloy or the chromium in the chromium-bearing composite (relative to rate of oxidation of chromium or the chromium-bearing metallic alloy or the chromium-bearing composite in air in the absence of the salt) in order to maintain a continuous $Cr_2O_3$ scale of the same thickness on the chromium surface or chromium-bearing metal alloy surface or chromium-bearing composite surface. Such an enhanced rate of oxidation of chromium will enhance the rate of consumption of chromium or chromium in the alloy or chromium in the chromium-bearing composite and result in an undesired increase in the rate of corrosion of the chromium or chromium-bearing alloy or chromium-bearing composite. Such enhanced oxidation of chromium or chromium in the metallic alloy or chromium in the chromium-bearing composite upon exposure to the molten $CaCl_2$-NaCl salt at 750° C. in air can be significantly reduced if the molten $CaCl_2$-NaCl salt is doped with $Cr_2O_3$ prior to exposure of the chromium or chromium-bearing alloy or chromium-bearing composite to this salt. Hence, exposure of chromium or chromium-bearing metal alloy or chromium-bearing composite in air to a molten $CaCl_2$-NaCl salt that has been saturated with $Cr_2O_3$ at 750° C. will allow for the formation of a $Cr_2O_3$ scale on chromium or on the chromium-bearing metallic alloy or on the chromium-bearing composite without the subsequent dissolution of this $Cr_2O_3$ scale in the $Cr_2O_3$-saturated molten $CaCl_2$-NaCl salt. That is, the corrosion rate of chromium or a chromium-bearing metallic alloy or chromium-bearing composite (coated with a $Cr_2O_3$ scale) in the molten $CaCl_2$-NaCl salt at 750° C. in air will be significantly reduced if the $CaCl_2$-NaCl salt is saturated with a modest $Cr_2O_3$ addition. Hence, a key aspect of the present disclosure is to provide a molten salt (such as a molten $CaCl_2$-NaCl salt) at high temperatures (such as at 750° C.) and high oxygen partial pressures (such as air), with the molten salt possessing a dissolved concentration (up to the saturation concentration) of a corrosion product (such as dissolved $Cr_2O_3$), so as to dramatically lower the rate of corrosion of a metal (such as chromium) or a metallic alloy (such as a chromium-bearing alloy that is capable of forming an external $Cr_2O_3$ scale) or a metal-bearing composite (such as a chromium-bearing composite that is capable of forming an external $Cr_2O_3$ scale) exposed to such a molten salt.

Figure 4:
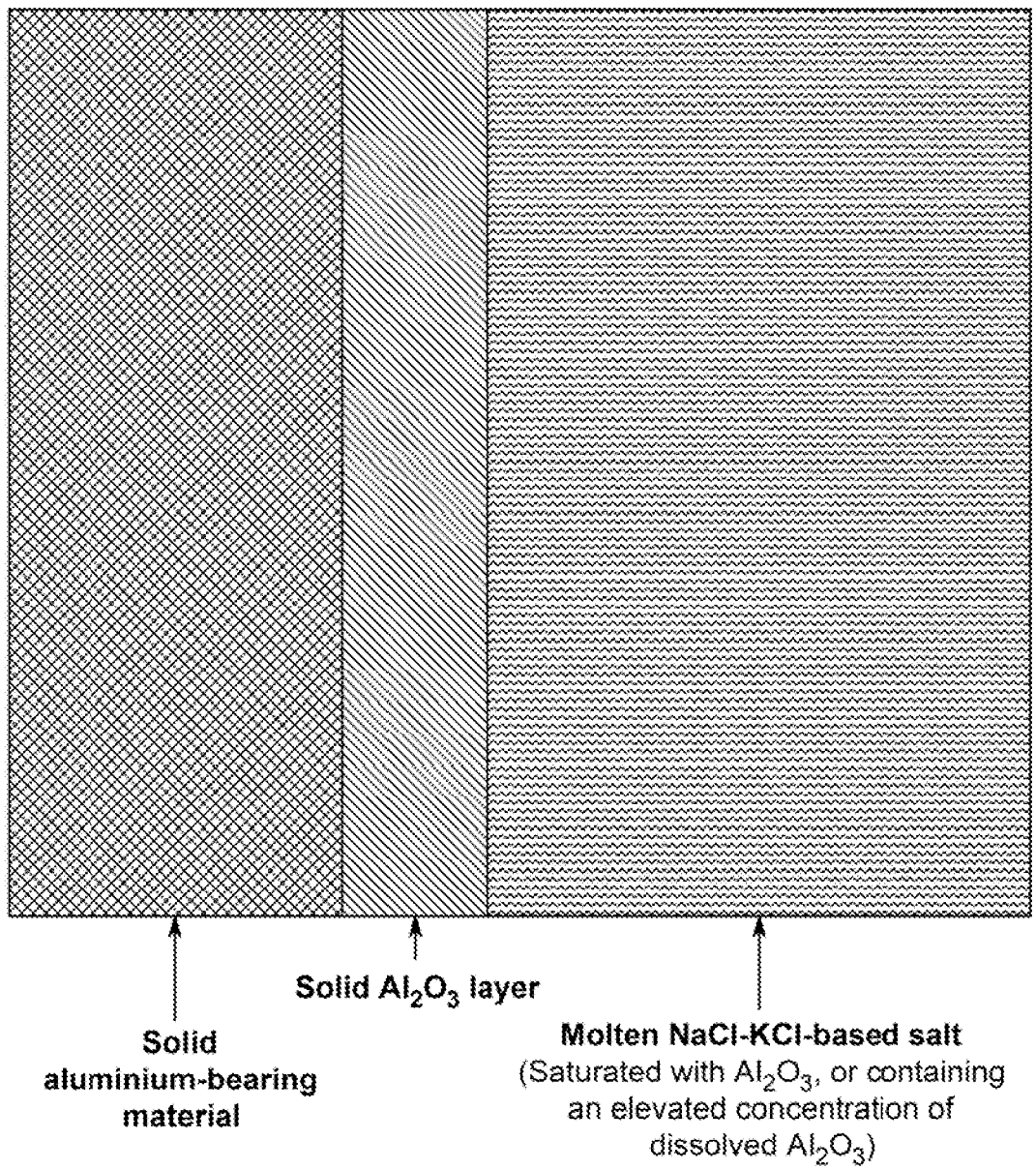
FIG. 4 is a schematic illustration of an example of this disclosure containing a solid aluminum-bearing material exposed to a molten NaCl-KCl salt environment.

FIG. 4 is a schematic illustration of an example of this disclosure containing a solid aluminum-bearing material exposed to a molten NaCl-KCl salt environment. Referring to FIG. 4, a solid aluminum or aluminum-bearing metallic alloy has a solid $Al_2O_3$ layer or scale such that the scale is in contact with molten NaCl-KCl salt saturated with $Al_2O_3$, or containing an elevated concentration of dissolved $Al_2O_3$. In FIG. 4, the bold vertical lines are used to denote the interfaces between a solid material and a solid product layer or between a solid product layer and a liquid. The solid $Al_2O_3$ layer can be formed upon exposure of the Al-bearing solid material to a suitable gaseous atmosphere and/or to $Al_2O_3$-saturated or $Al_2O_3$-enriched molten NaCl-KCl salt, provided the molten salt contains an adequate amount of oxygen and/or water to create the $Al_2O_3$ layer. Consider, an aluminum or an aluminum-bearing metallic alloy (such as a nickel-based aluminum-bearing alloy, or an iron-based aluminum-bearing alloy, or a cobalt-based aluminum-bearing alloy) or an aluminum-bearing composite capable of forming an external $Al_2O_3$ scale upon exposure to air at 727° C., with this $Al_2O_3$ scale exhibiting a thickening rate that decreases with increasing time of exposure to air at 727° C. Consider further that this aluminum or aluminum-bearing metallic alloy or an aluminum-bearing composite is exposed to a molten salt, containing a mixture of NaCl and KCl (such as an equimolar mixture of NaCl and KCl), at 727° C. in air. If the aluminum or aluminum-bearing metallic alloy or aluminum-bearing composite is pre-oxidized in air at 727° C. to form an external $Al_2O_3$ scale, or if the aluminum or aluminum-bearing metallic alloy or aluminum-bearing composite initially forms an external $Al_2O_3$ scale upon exposure to the NaCl-KCl molten salt at 727° C. in an air environment, then the $Al_2O_3$ scale present on the aluminum or aluminum-bearing alloy or aluminum-bearing composite will also dissolve into the NaCl-KCl molten salt at 727° C. if the NaCl-KCl salt is not saturated with $Al_2O_3$. Such dissolution of $Al_2O_3$ in the molten NaCl-KCl salt will result in a thinning of the $Al_2O_3$ scale present on the aluminum surface or aluminum-bearing metallic alloy surface or aluminum-bearing composite surface which, in turn, will require an enhanced rate of oxidation of the aluminum (relative to rate of oxidation of aluminum or the aluminum-bearing metallic alloy or the aluminum-bearing composite in air in the absence of the salt) in order to maintain a continuous $Al_2O_3$ scale of the same thickness on the aluminum surface or aluminum-bearing metal alloy surface or aluminum-bearing composite surface. Such an enhanced rate of oxidation of aluminum will enhance the rate of consumption of aluminum or aluminum in the alloy or aluminum in the aluminum-bearing composite and result in an undesired increase in the rate of corrosion of the aluminum or aluminum-bearing alloy or aluminum-bearing composite. Such enhanced oxidation of aluminum or aluminum in the metal alloy or aluminum in the composite upon exposure to the molten NaCl-KCl salt at 727° C. in air can be significantly reduced if the NaCl-KCl salt is doped with $Al_2O_3$ prior to exposure of the aluminum or aluminum-bearing alloy or aluminum-bearing composite to this salt. Hence, exposure of aluminum or aluminum-bearing metallic alloy or aluminum-bearing composite in air to a molten NaCl-KCl salt that has been saturated with $Al_2O_3$ at 727° C. will allow for the formation of an $Al_2O_3$ scale on the aluminum or aluminum-bearing metal alloy or aluminum-bearing composite without the subsequent dissolution of this $Al_2O_3$ scale in the $Al_2O_3$-saturated molten NaCl-KCl salt. That is, the corrosion rate of aluminum, an aluminum-bearing metal alloy, or an aluminum-bearing composite (coated with an $Al_2O_3$ scale) in the molten NaCl-KCl salt at 727° C. in air will be significantly reduced if the NaCl-KCl salt is saturated with $Al_2O_3$. Hence, a key aspect of the present disclosure is to provide a molten salt (such as a molten NaCl-KCl salt) at high temperatures (such as at 727° C.) and high oxygen partial pressures (such as air), with the molten salt possessing a dissolved concentration (up to the saturation concentration) of a corrosion product (such as dissolved $Al_2O_3$), so as to dramatically lower the rate of corrosion of a metal (such as aluminum) or a metallic alloy (such as an aluminum-bearing alloy that is capable of forming an external $Al_2O_3$ scale) or a metal-bearing composite (such as an aluminum-bearing composite that is capable of forming an external $Al_2O_3$ scale) exposed to such a molten salt.

Figure 5:
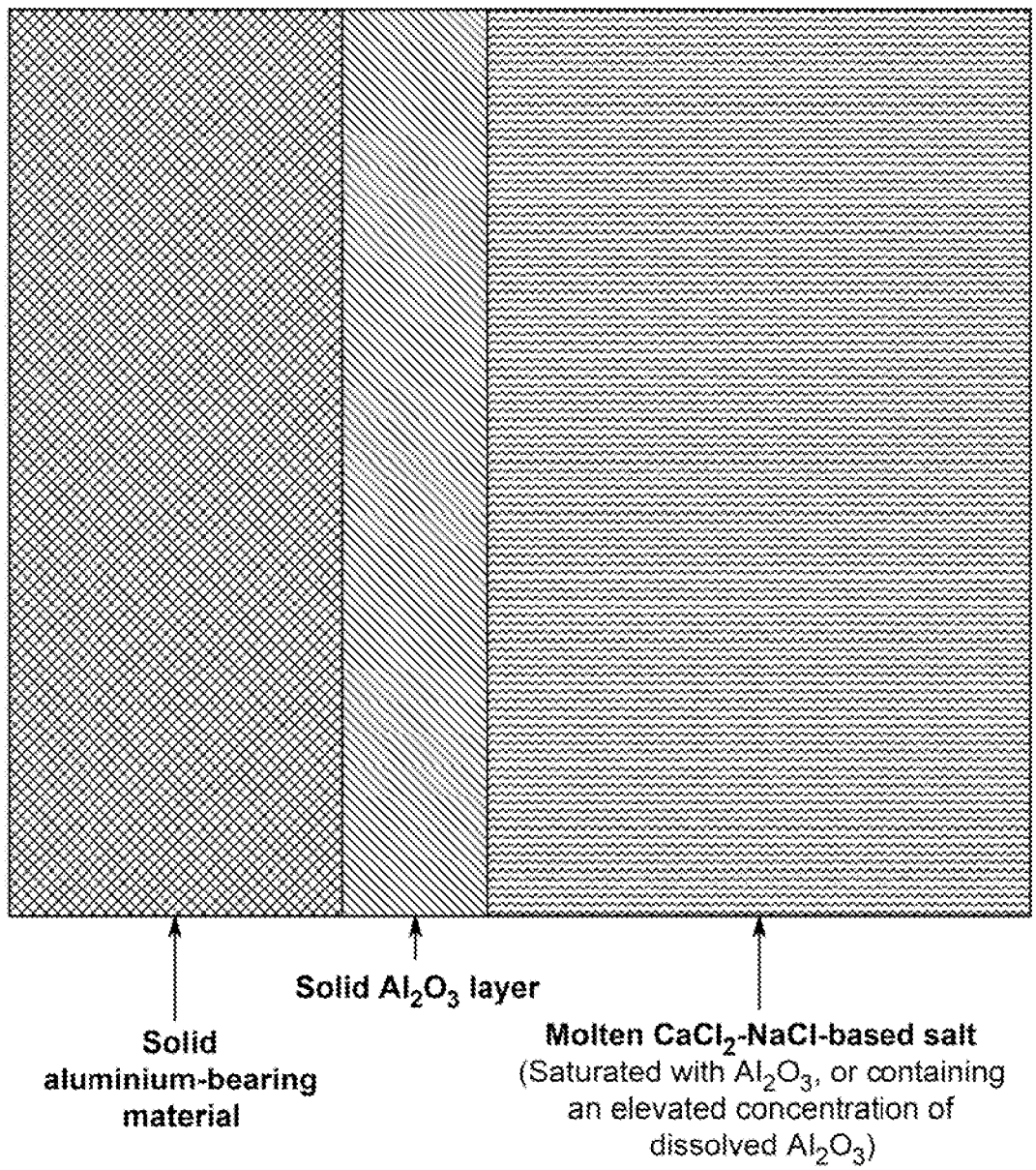
FIG. 5 is a schematic illustration of an example of this disclosure containing a solid aluminum-bearing material exposed to a molten $CaCl_2$-NaCl salt environment.

FIG. 5 is a schematic illustration of an example of this disclosure containing a solid aluminum-bearing material exposed to a molten $CaCl_2$-NaCl salt environment. Referring to FIG. 5, a solid aluminum or aluminum-bearing metallic alloy has a solid $Al_2O_3$ product layer or scale such that the scale is in contact with molten $CaCl_2$-NaCl salt saturated with $Al_2O_3$, or containing an elevated concentration of dissolved $Al_2O_3$. In FIG. 5, the bold vertical lines are used to denote the interfaces between a solid material and a solid product layer or between a solid product layer and a liquid. The solid $Al_2O_3$ layer can be formed upon exposure of the Al-bearing solid material to a suitable gaseous atmosphere and/or to $Al_2O_3$-saturated or $Al_2O_3$-enriched $CaCl_2$-NaCl liquid, provided the molten salt contains an adequate amount of oxygen and/or water to create the $Al_2O_3$ layer. Consider an aluminum or an aluminum-bearing metallic alloy (such as a nickel-based aluminum-bearing alloy, or an iron-based aluminum-bearing alloy, or a cobalt-based aluminum-bearing alloy) or an aluminum-bearing composite capable of forming an external $Al_2O_3$ scale upon exposure to air at 750° C., with this $Al_2O_3$ scale exhibiting a thickening rate that decreases with increasing time of exposure to air at 750° C. Consider further that this aluminum or aluminum-bearing metallic alloy or an aluminum-bearing composite is exposed to a molten salt, containing $CaCl_2$ and NaCl (such as a liquid solution containing 48 mole % $CaCl_2$ and 52 mole % NaCl), at 750° C. in air. If the aluminum or aluminum-bearing metallic alloy or an aluminum-bearing composite is pre-oxidized in air at 750° C. to form an external $Al_2O_3$ scale, or if the aluminum or aluminum-bearing metallic alloy or an aluminum-bearing composite initially forms an external $Al_2O_3$ scale upon exposure to the $CaCl_2$-NaCl molten salt at 750° C. in an air environment, then the $Al_2O_3$ scale present on the aluminum or aluminum-bearing alloy or aluminum-bearing composite will also dissolve into the molten $CaCl_2$-NaCl salt at 750° C. if the molten $CaCl_2$-NaCl salt is not saturated with $Al_2O_3$. Such dissolution of $Al_2O_3$ in the molten $CaCl_2$-NaCl salt will result in a thinning of the $Al_2O_3$ scale present on the aluminum surface or aluminum-bearing metallic alloy surface or an aluminum-bearing composite surface which, in turn, will require an enhanced rate of oxidation of the aluminum or aluminum-bearing alloy or aluminum-bearing composite (relative to rate of oxidation of aluminum or the aluminum-bearing metallic alloy in air in the absence of the salt) in order to maintain a continuous $Al_2O_3$ scale of the same thickness on the metal alloy surface. Such an enhanced rate of oxidation of aluminum will enhance the rate of consumption of aluminum or aluminum in the alloy or aluminum in the aluminum-bearing composite and result in an undesired increase in the rate of corrosion of the aluminum or aluminum-bearing alloy or aluminum-bearing composite. Such enhanced oxidation of aluminum or aluminum in the $CaCl_2$-NaCl salt at 750° C. in air can be significantly reduced if the $CaCl_2$-NaCl salt is doped with $Al_2O_3$ prior to exposure of the aluminum or aluminum-bearing alloy or aluminum-bearing composite to this salt. Hence, exposure of aluminum or aluminum-bearing metallic alloy or aluminum-bearing composite in air to a molten $CaCl_2$-NaCl salt that has been saturated with $Al_2O_3$ at 750° C. will allow for the formation of an $Al_2O_3$ scale on the aluminum or aluminum-bearing metal alloy or aluminum-bearing composite without the subsequent dissolution of this $Al_2O_3$ scale in the $Al_2O_3$-saturated molten $CaCl_2$-NaCl salt. That is, the corrosion rate of aluminum or an aluminum-bearing metal alloy or an aluminum-bearing composite (coated with an $Al_2O_3$ scale) in the molten $CaCl_2$-NaCl salt at 750° C. in air will be significantly reduced if the molten $CaCl_2$-NaCl salt is saturated with $Al_2O_3$. Hence, a key aspect of the present disclosure is to provide a molten salt (such as a molten $CaCl_2$-NaCl salt) at high temperatures (such as at 750° C.) and high oxygen partial pressures (such as air), with the molten salt possessing a dissolved concentration (up to the saturation concentration) of a corrosion product (such as dissolved $Al_2O_3$), so as to dramatically lower the rate of corrosion of a metal (such as aluminum) or a metallic alloy (such as an aluminum-bearing alloy that is capable of forming an external $Al_2O_3$ scale) exposed to such a molten salt.

Figure 6:
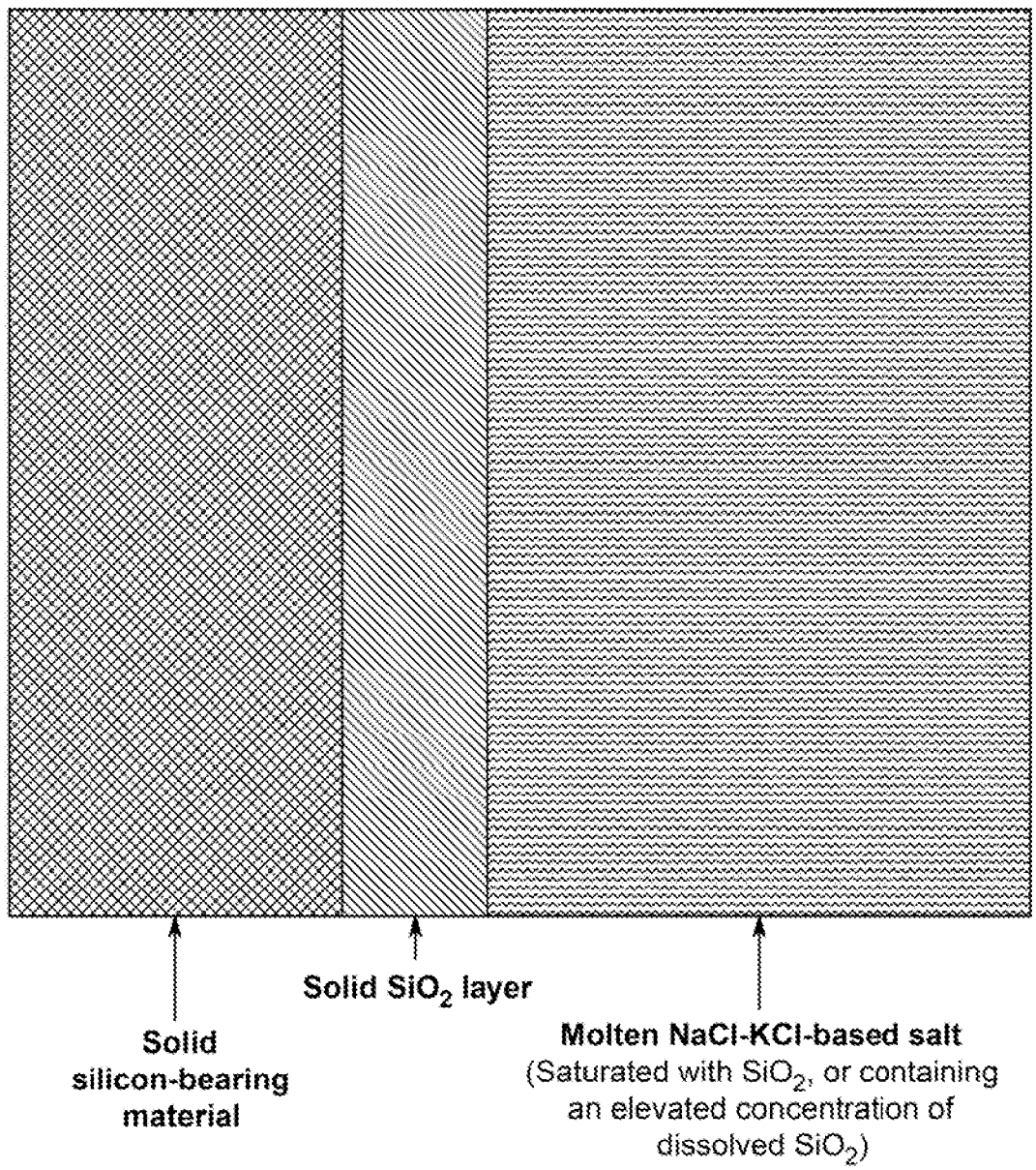
FIG. 6 is a schematic illustration of an example of this disclosure containing a solid silicon-bearing material exposed to a molten NaCl-KCl salt environment.

FIG. 6 is a schematic illustration of an example of this disclosure containing a solid silicon-bearing material exposed to a molten NaCl-KCl salt environment. Referring to FIG. 6, a solid silicon or silicon-bearing metallic alloy has a solid $SiO_2$ layer or scale such that the scale is in contact with molten NaCl-KCl salt saturated with $SiO_2$, or containing an elevated concentration of dissolved $SiO_2$. In FIG. 6, the bold vertical lines are used to denote the interfaces between a solid material and a solid product layer or between a solid product layer and a liquid. The solid $SiO_2$ layer can be formed upon exposure of the Si-bearing solid material to a suitable gaseous atmosphere and/or to $SiO_2$-saturated or $SiO_2$-enriched molten NaCl-KCl salt, provided the molten salt contains an adequate amount of oxygen and/or water to create the $SiO_2$ layer. Consider, silicon or a silicon-bearing metallic alloy (such as a nickel-based silicon-bearing alloy, or an iron-based silicon-bearing alloy, or a cobalt-based silicon-bearing alloy) or a silicon-bearing composite capable of forming an external $SiO_2$ scale upon exposure to air at 727° C., with this $SiO_2$ scale exhibiting a thickening rate that decreases with increasing time of exposure to air at 727° C. Consider further that this silicon or silicon-bearing metallic alloy or a silicon-bearing composite is exposed to a molten salt, containing a mixture of NaCl and KCl (such as an equimolar mixture of NaCl and KCl), at 727° C. in air. If the silicon or silicon-bearing metallic alloy or a silicon-bearing composite is pre-oxidized in air at 727° C. to form an external $SiO_2$ scale, or if the silicon or silicon-bearing metallic alloy or silicon-bearing composite initially forms an external $SiO_2$ scale upon exposure to the NaCl-KCl molten salt at 727° C. in an air environment, then the $SiO_2$ scale present on the silicon or silicon-bearing alloy or silicon-bearing composite will also dissolve into the NaCl-KCl molten salt at 727° C. if the NaCl-KCl salt is not saturated with $SiO_2$. Such dissolution of $SiO_2$ in the molten NaCl-KCl salt will result in a thinning of the $SiO_2$ scale present on the silicon surface or silicon-bearing metallic alloy surface or silicon-bearing composite surface which, in turn, will require an enhanced rate of oxidation of the silicon (relative to rate of oxidation of silicon or the silicon-bearing metallic alloy or the silicon-bearing composite in air in the absence of the salt) in order to maintain a continuous $SiO_2$ scale of the same thickness on the metal alloy surface. Such an enhanced rate of oxidation of silicon will enhance the rate of consumption of silicon or silicon in the metallic alloy or silicon in the silicon-bearing composite and result in an undesired increase in the rate of corrosion of the silicon or silicon-bearing alloy or silicon-bearing composite. Such enhanced oxidation of silicon or silicon in the metal alloy or silicon in the silicon-bearing composite upon exposure to the NaCl-KCl salt at 727° C. in air can be significantly reduced if the NaCl-KCl salt is doped with $SiO_2$ prior to exposure of the silicon or silicon-bearing alloy or silicon-bearing composite to this salt. Hence, exposure of silicon or silicon-bearing metallic alloy or silicon-bearing composite in air to a molten NaCl-KCl salt that has been saturated with $SiO_2$ at 727° C. will allow for the formation of a $SiO_2$ scale on the silicon or silicon-bearing metal alloy or silicon-bearing composite without the subsequent dissolution of this $SiO_2$ scale in the $SiO_2$-saturated NaCl-KCl salt. That is, the corrosion rate of silicon or a silicon-bearing metal alloy or silicon-bearing composite (coated with a $SiO_2$ scale) in the molten NaCl-KCl salt at 727° C. in air will be significantly reduced if the NaCl-KCl salt is saturated with $SiO_2$. Hence, a key aspect of the present disclosure is to provide a molten salt (such as a molten NaCl-KCl salt) at high temperatures (such as at 727° C.) and high oxygen partial pressures (such as air), with the molten salt possessing a dissolved concentration (up to the saturation concentration) of a corrosion product (such as dissolved $SiO_2$), so as to dramatically lower the rate of corrosion of a metal (such as silicon) or a metallic alloy (such as a silicon-bearing alloy that is capable of forming an external $SiO_2$ scale) exposed to such a molten salt.

Figure 7:
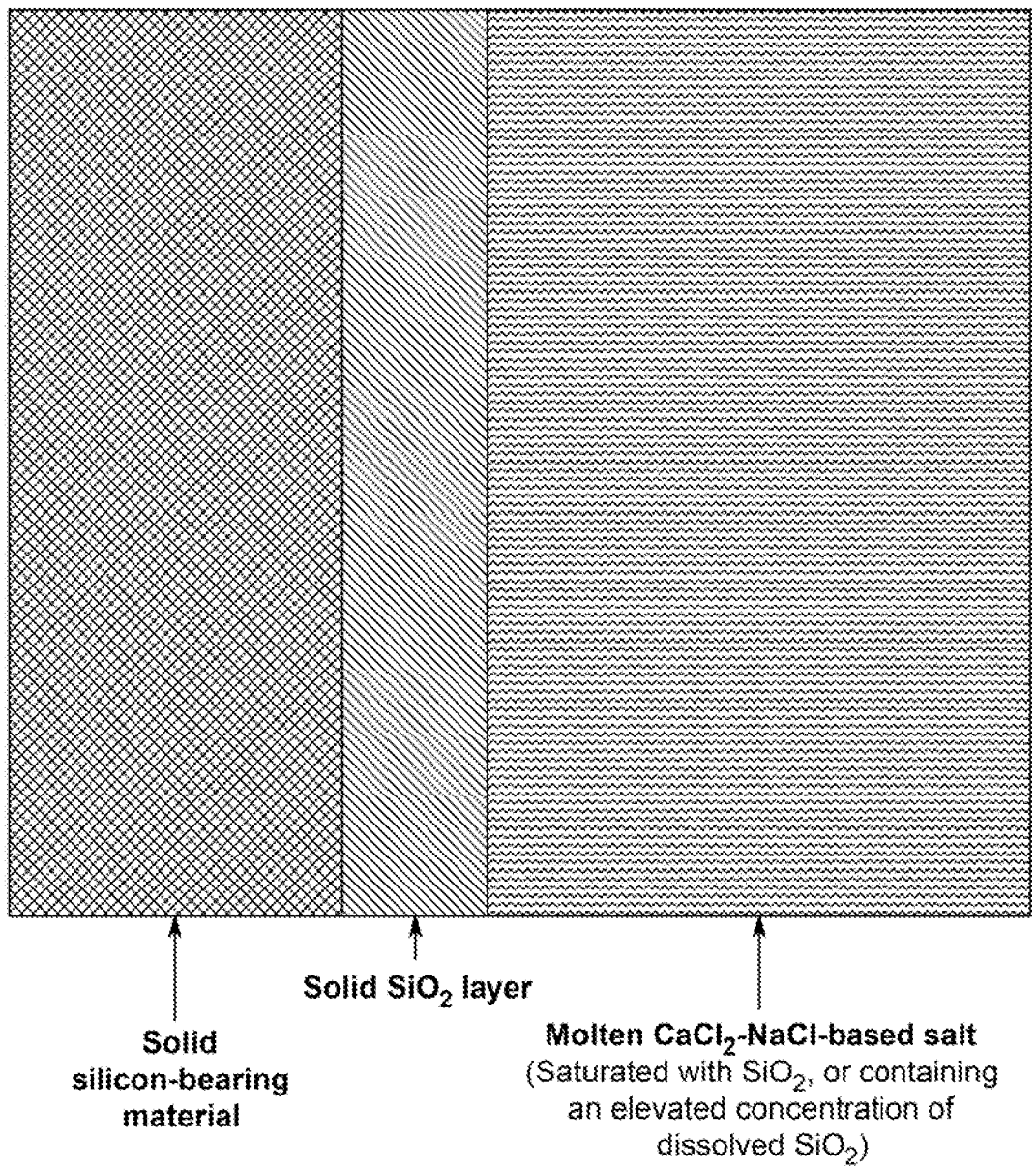
FIG. 7 is a schematic illustration of an example of this disclosure containing a solid silicon-bearing material exposed to a molten $CaCl_2$-NaCl salt environment.

FIG. 7 is a schematic illustration of an example of this disclosure containing a solid silicon-bearing material exposed to a molten $CaCl_2$-NaCl salt environment. Referring to FIG. 7, a solid silicon or silicon-bearing metallic alloy has a solid $SiO_2$ layer or scale such that the scale is in contact with molten $CaCl_2$-NaCl salt saturated with $SiO_2$, or containing an elevated concentration of dissolved $SiO_2$. In FIG. 7, the bold vertical lines are used to denote the interfaces between a solid material and a solid product layer or between a solid product layer and a liquid. The solid $SiO_2$ layer can be formed upon exposure of the Si-bearing solid material to a suitable gaseous atmosphere and/or to $SiO_2$-saturated or $SiO_2$-enriched molten $CaCl_2$-NaCl salt environment, provided the molten salt contains an adequate amount of oxygen and/or water to create the $SiO_2$ layer. Consider, silicon or a silicon-bearing metallic alloy (such as a nickel-based silicon-bearing alloy, or an iron-based silicon-bearing alloy, or a cobalt-based silicon-bearing alloy) or a silicon-bearing composite capable of forming an external $SiO_2$ scale upon exposure to air at 750° C., with this $SiO_2$ scale exhibiting a thickening rate that decreases with increasing time of exposure to air at 750° C. Consider further that this silicon or silicon-bearing metallic alloy or silicon-bearing composite is exposed to a molten salt, containing $CaCl_2$ and NaCl (such as a liquid solution containing 48 mole % $CaCl_2$ and 52 mole % NaCl), at 750° C. in air. If the silicon or silicon-bearing metallic alloy or silicon-bearing composite is pre-oxidized in air at 750° C. to form an external $SiO_2$ scale, or if the silicon or silicon-bearing metallic alloy or silicon-bearing composite initially forms an external $SiO_2$ scale upon exposure to the molten $CaCl_2$-NaCl salt at 750° C. in an air environment, then the $SiO_2$ scale present on the silicon or silicon-bearing alloy or silicon-bearing composite will also dissolve into the molten $CaCl_2$-NaCl salt at 750° C. if the molten $CaCl_2$-NaCl salt is not saturated with $SiO_2$. Such dissolution of $SiO_2$ in the molten $CaCl_2$-NaCl salt will result in a thinning of the $SiO_2$ scale present on the silicon surface or silicon-bearing metallic alloy surface or silicon-bearing composite surface which, in turn, will require an enhanced rate of oxidation of the silicon (relative to rate of oxidation of silicon or the silicon-bearing metallic alloy in air in the absence of the salt) in order to maintain a continuous $SiO_2$ scale of the same thickness on the silicon, silicon-bearing alloy, or silicon-bearing composite surface. Such an enhanced rate of oxidation of silicon will enhance the rate of consumption of silicon or silicon in the metallic alloy or silicon in the silicon-bearing composite and result in an undesired increase in the rate of corrosion of the silicon or silicon-bearing alloy or silicon-bearing composite. Such enhanced oxidation of silicon or silicon in the metal alloy or silicon in the silicon-bearing composite upon exposure to the molten $CaCl_2$-NaCl salt at 750° C. in air can be significantly reduced if the molten $CaCl_2$-NaCl salt is doped with $SiO_2$ prior to exposure of the silicon or silicon-bearing alloy to this salt. Hence, exposure of silicon or silicon-bearing metallic alloy or silicon-bearing composite in air to a molten $CaCl_2$-NaCl salt that has been saturated with $SiO_2$ at 750° C. will allow for the formation of a $SiO_2$ scale on the silicon or silicon-bearing metal alloy or silicon-bearing composite without the subsequent dissolution of this $SiO_2$ scale in the $SiO_2$-saturated molten $CaCl_2$-NaCl salt. That is, the corrosion rate of silicon or a silicon-bearing metal alloy or silicon-bearing composite (coated with a $SiO_2$ scale) in the molten $CaCl_2$-NaCl salt at 750° C. in air will be significantly reduced if the molten $CaCl_2$-NaCl salt is saturated with $SiO_2$. Hence, a key aspect of the present disclosure is to provide a molten salt (such as a molten $CaCl_2$-NaCl salt) at high temperatures (such as at 750° C.) and high oxygen partial pressures (such as air), with the molten salt possessing a dissolved concentration (up to the saturation concentration) of a corrosion product (such as dissolved $SiO_2$), so as to dramatically lower the rate of corrosion of a metal (such as silicon) or a metallic alloy (such as a silicon-bearing alloy that is capable of forming an external $SiO_2$ scale) exposed to such a molten salt.

Figure 8:
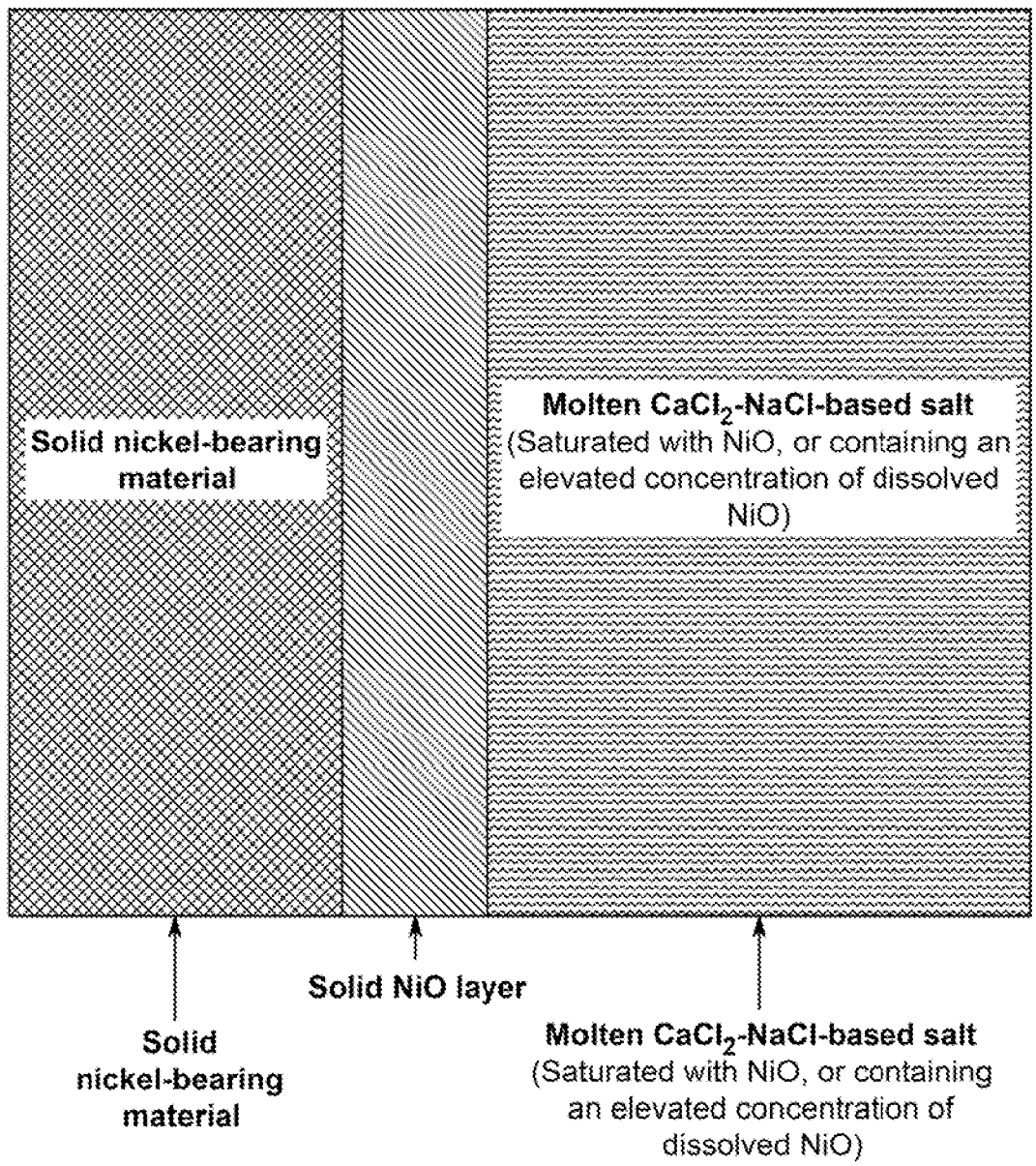
FIG. 8 is a schematic illustration of an example of this disclosure containing a solid nickel-bearing material exposed to a molten NaCl-KCl salt environment.

FIG. 8 is a schematic illustration of an example of this disclosure containing a solid nickel-bearing material exposed to a molten NaCl-KCl salt environment. Referring to FIG. 8, a solid nickel or nickel-bearing metallic alloy has a solid NiO layer or scale such that the scale is in contact with molten NaCl-KCl salt saturated with NiO, or containing an elevated concentration of dissolved NiO. In FIG. 8, the bold vertical lines are used to denote the interfaces between a solid material and a solid product layer or between a solid product layer and a liquid. The solid NiO layer can be formed upon exposure of the Ni-bearing solid material to a suitable gaseous atmosphere and/or to NiO-saturated or NiO-enriched molten NaCl-KCl salt, provided the molten salt contains an adequate amount of oxygen and/or water to create the NiO layer. Consider a nickel or a nickel-bearing metallic alloy or a nickel-bearing composite capable of forming an external NiO scale upon exposure to air at 727° C., with this NiO scale exhibiting a thickening rate that decreases with increasing time of exposure to air at 727° C. Consider further that this nickel or nickel-bearing metallic alloy or a nickel-bearing composite is exposed to a molten salt, containing a mixture of NaCl and KCl (such as an equimolar mixture of NaCl and KCl), at 727° C. in air. If the nickel or nickel-bearing metallic alloy or nickel-bearing composite is pre-oxidized in air at 727° C. to form an external NiO scale, or if the nickel or nickel-bearing metallic alloy or nickel-bearing composite initially forms an external NiO scale upon exposure to the NaCl-KCl molten salt at 727° C. in an air environment, then the NiO scale present on the nickel or nickel-bearing alloy or nickel-bearing composite will also dissolve into the NaCl-KCl molten salt at 727° C. if the NaCl-KCl salt is not saturated with NiO. Such dissolution of NiO in the molten NaCl-KCl salt will result in a thinning of the NiO scale present on the nickel surface or nickel-bearing metallic alloy surface or nickel-bearing composite surface which, in turn, will require an enhanced rate of oxidation of the nickel (relative to rate of oxidation of nickel or the nickel-bearing metallic alloy or the nickel-bearing composite in air in the absence of the salt) in order to maintain a continuous NiO scale of the same thickness on the metal alloy surface. Such an enhanced rate of oxidation of nickel will enhance the rate of consumption of nickel or nickel in the metallic alloy or nickel in the nickel-bearing composite and result in an undesired increase in the rate of corrosion of the nickel or nickel-bearing alloy or nickel-bearing composite. Such enhanced oxidation of nickel or nickel in the metal alloy or nickel in the nickel-bearing composite upon exposure to the NaCl-KCl salt at 727° C. in air can be significantly reduced if the NaCl-KCl salt is doped with NiO prior to exposure of the nickel or nickel-bearing alloy or nickel-bearing composite to this salt. Hence, exposure of nickel or nickel-bearing metallic alloy or nickel-bearing composite in air to a molten NaCl-KCl salt that has been saturated with NiO at 727° C. will allow for the formation of a NiO scale on the nickel or nickel-bearing metal alloy or nickel-bearing composite without the subsequent dissolution of this NiO scale in the NiO-saturated NaCl-KCl salt. That is, the corrosion rate of nickel or a nickel-bearing metal alloy or nickel-bearing composite (coated with a NiO scale) in the molten NaCl-KCl salt at 727° C. in air will be significantly reduced if the NaCl-KCl salt is saturated with NiO. Hence, a key aspect of the present disclosure is to provide a molten salt (such as a molten NaCl-KCl salt) at high temperatures (such as at 727° C.) and high oxygen partial pressures (such as air), with the molten salt possessing a dissolved concentration (up to the saturation concentration) of a corrosion product (such as dissolved NiO), so as to dramatically lower the rate of corrosion of a metal (such as nickel) or a metallic alloy (such as a nickel-bearing alloy that is capable of forming an external NiO scale) or a metal-bearing composite (such as a nickel-bearing composite that is capable of forming an external NiO scale) exposed to such a molten salt.

Figure 9:
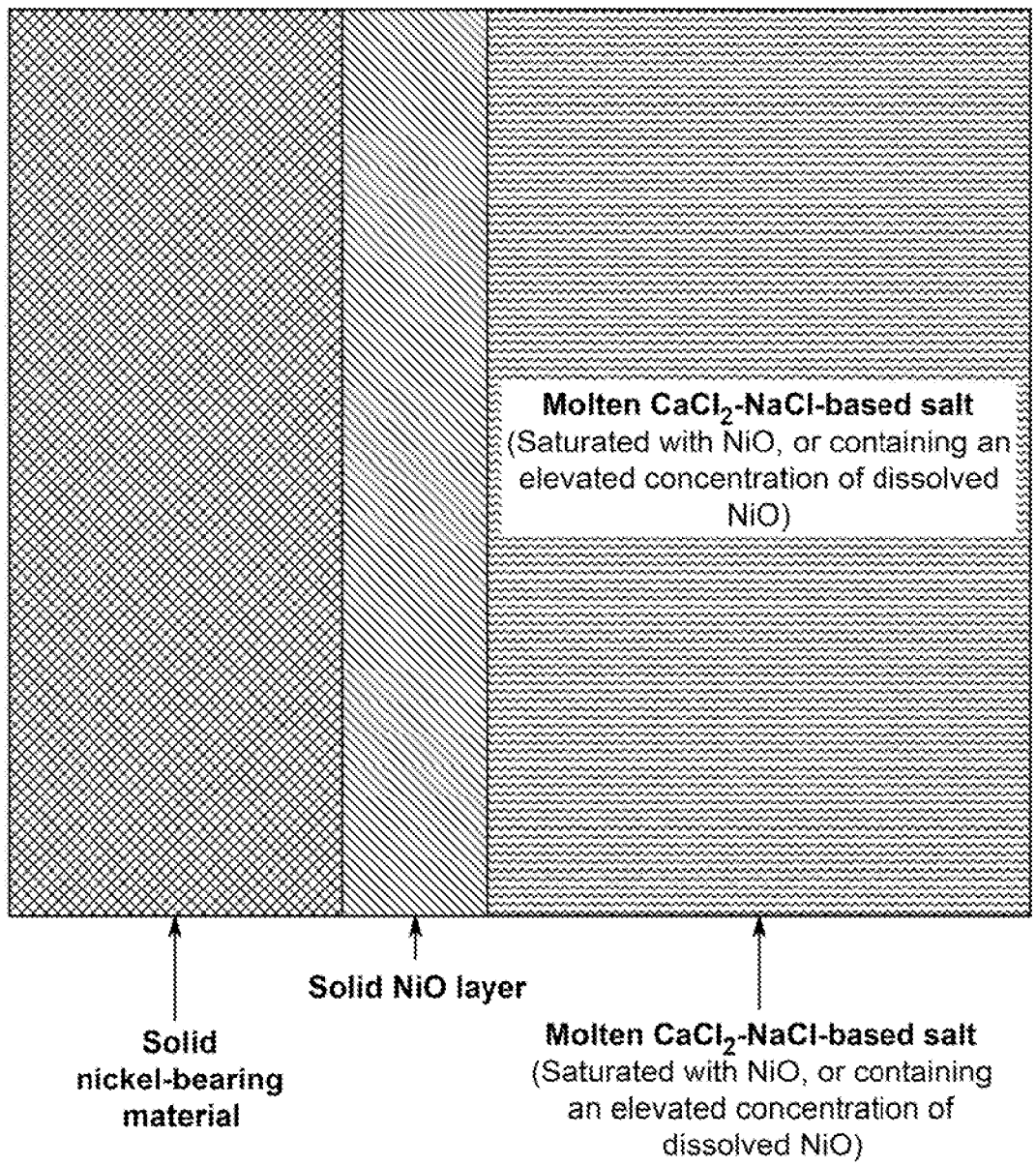
FIG. 9 is a schematic illustration of an example of this disclosure containing a solid nickel-bearing material exposed to a molten $CaCl_2$-NaCl salt environment.

FIG. 9 is a schematic illustration of an example of this disclosure containing a solid nickel-bearing material exposed to a molten $CaCl_2$-NaCl salt environment. Referring to FIG. 9, a solid nickel or nickel-bearing metallic alloy has a solid NiO layer or scale such that the scale is in contact with molten $CaCl_2$-NaCl salt saturated with NiO, or containing an elevated concentration of dissolved NiO. In FIG. 9, the bold vertical lines are used to denote the interfaces between a solid material and a solid product layer or between a solid product layer and a liquid. The solid NiO layer can be formed upon exposure of the Ni-bearing solid material to a suitable gaseous atmosphere and/or to NiO-saturated or NiO-enriched molten $CaCl_2$-NaCl salt, provided the molten salt contains an adequate amount of oxygen and/or water to create the NiO layer. Consider a nickel or a nickel-bearing metallic alloy or a nickel-bearing composite capable of forming an external NiO scale upon exposure to air at 750° C., with this NiO scale exhibiting a thickening rate that decreases with increasing time of exposure to air at 750° C. Consider further that this nickel or nickel-bearing metallic alloy or nickel-bearing composite is exposed to a molten salt, containing $CaCl_2$ and NaCl (such as a liquid solution containing 48 mole % $CaCl_2$ and 52 mole % NaCl), at 750° C. in air. If the nickel or nickel-bearing metallic alloy or nickel-bearing composite is pre-oxidized in air at 750° C. to form an external NiO scale, or if the nickel or nickel-bearing metallic alloy or nickel-bearing composite initially forms an external NiO scale upon exposure to the molten $CaCl_2$-NaCl salt at 750° C. in an air environment, then the NiO scale present on the nickel or nickel-bearing alloy or nickel-bearing composite will also dissolve into the molten $CaCl_2$-NaCl salt at 750° C. if the molten $CaCl_2$-NaCl salt is not saturated with NiO. Such dissolution of NiO in the molten $CaCl_2$-NaCl salt will result in a thinning of the NiO scale present on the nickel surface or nickel-bearing metallic alloy surface or nickel-bearing composite surface which, in turn, will require an enhanced rate of oxidation of the nickel (relative to rate of oxidation of nickel or the nickel-bearing metallic alloy or the nickel-bearing composite in air in the absence of the salt) in order to maintain a continuous NiO scale of the same thickness on the nickel, nickel-bearing alloy, or nickel-bearing composite surface. Such an enhanced rate of oxidation of nickel will enhance the rate of consumption of nickel or nickel in the metallic alloy or nickel in the nickel-bearing composite and result in an undesired increase in the rate of corrosion of the nickel or nickel-bearing alloy or nickel-bearing composite. Such enhanced oxidation of nickel or nickel in the metallic alloy or nickel in the nickel-bearing composite upon exposure to the molten $CaCl_2$-NaCl salt at 750° C. in air can be significantly reduced if the molten $CaCl_2$-NaCl salt is doped with NiO prior to exposure of the nickel or nickel-bearing alloy or nickel-bearing composite to this salt. Hence, exposure of nickel or nickel-bearing metallic alloy or nickel-bearing composite in air to a molten $CaCl_2$-NaCl salt that has been saturated with NiO at 750° C. will allow for the formation of a NiO scale on the nickel or nickel-bearing metal alloy or nickel-bearing composite without the subsequent dissolution of this NiO scale in the NiO-saturated molten $CaCl_2$-NaCl salt. That is, the corrosion rate of nickel or a nickel-bearing metal alloy or nickel-bearing composite (coated with a NiO scale) in the molten $CaCl_2$-NaCl salt at 750° C. in air will be significantly reduced if the molten $CaCl_2$-NaCl salt is saturated with NiO. Hence, a key aspect of the present disclosure is to provide a molten salt (such as a molten $CaCl_2$-NaCl salt) at high temperatures (such as at 750° C.) and high oxygen partial pressures (such as air), with the molten salt possessing a dissolved concentration (up to the saturation concentration) of a corrosion product (such as dissolved NiO), so as to dramatically lower the rate of corrosion of a metal (such as nickel) or a metallic alloy (such as a nickel-bearing alloy that is capable of forming an external NiO scale) or a metal-bearing composite (such as a nickel-bearing composite that is capable of forming an external NiO scale) exposed to such a molten salt.

Figure 10:
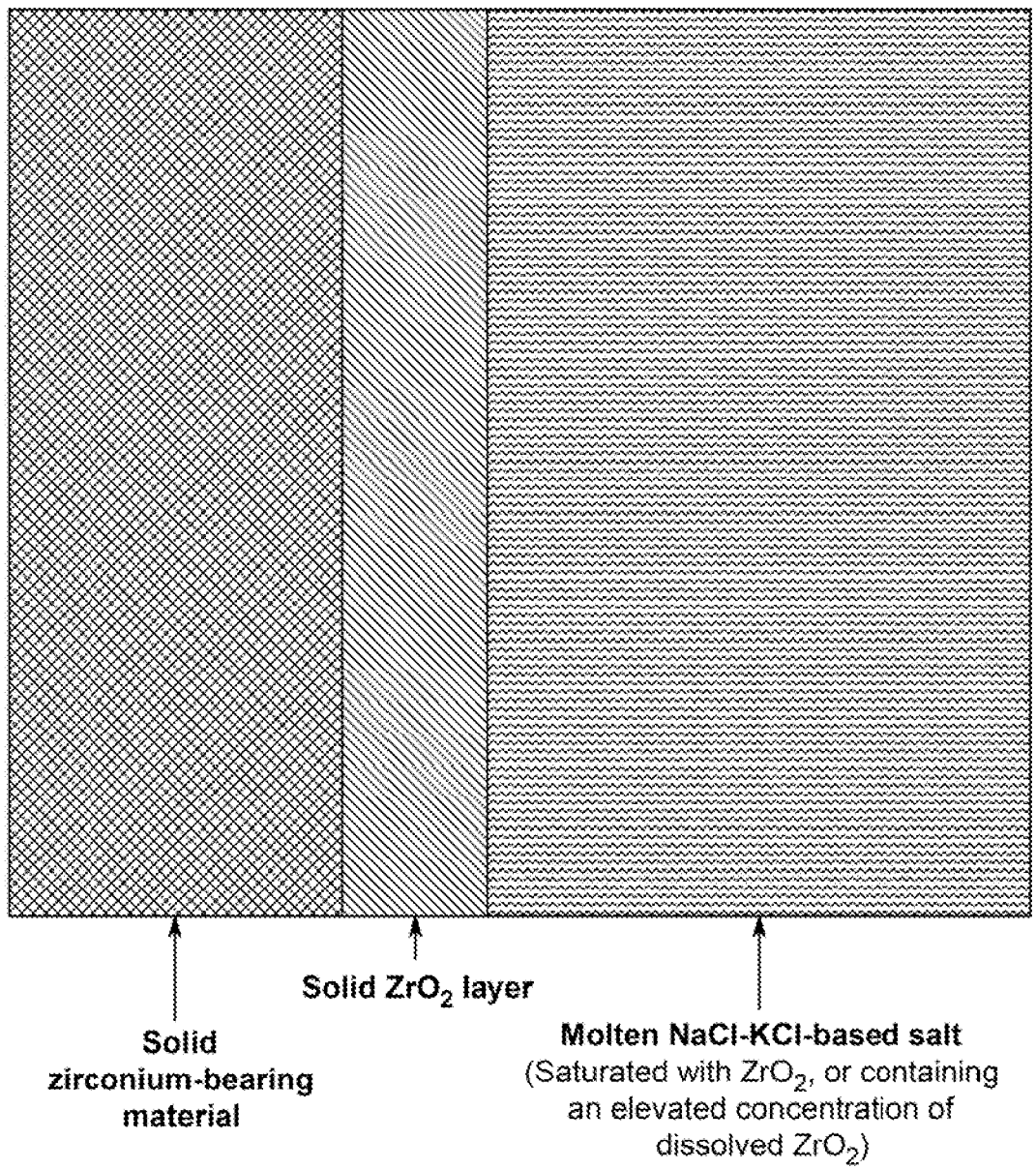
FIG. 10 is a schematic illustration of an example of this disclosure containing a solid zirconium-bearing material exposed to a molten NaCl-KCl salt environment.

FIG. 10 is a schematic illustration of an example of this disclosure containing a solid zirconium-bearing material exposed to a molten NaCl-KCl salt environment. Referring to FIG. 10, a solid zirconium or zirconium-bearing metallic alloy has a solid $ZrO_2$ layer or scale such that the scale is in contact with molten NaCl-KCl salt saturated with $ZrO_2$, or containing an elevated concentration of dissolved $ZrO_2$. In FIG. 10, the bold vertical lines are used to denote the interfaces between a solid material and a solid product layer or between a solid product layer and a liquid. The solid $ZrO_2$ layer can be formed upon exposure of the Zr-bearing solid material to a suitable gaseous atmosphere and/or to $SiO_2$-saturated or $SiO_2$-enriched molten NaCl-KCl salt, provided the molten salt contains an adequate amount of oxygen and/or water to create the $ZrO_2$ layer. Consider, a zirconium or a zirconium-bearing compound or a zirconium-bearing solid solution or a zirconium-bearing composite. Consider further that this zirconium or zirconium-bearing compound or zirconium-bearing solid solution or zirconium-bearing composite is exposed to a molten salt, containing a mixture of NaCl and KCl (such as an equimolar mixture of NaCl and KCl), at 727° C. in air. The zirconium or zirconium-bearing compound or zirconium-bearing solid solution or zirconium-bearing composite will dissolve into the NaCl-KCl molten salt at 727° C. if the NaCl-KCl salt is not saturated with $ZrO_2$. Such dissolution of zirconium or zirconium-bearing compound or zirconium-bearing solid solution or zirconium-bearing composite upon exposure to the NaCl-KCl salt at 727° C. in air can be significantly reduced if the NaCl-KCl salt is doped with $ZrO_2$ prior to exposure of the zirconium or zirconium-bearing compound or zirconium-bearing solid solution or zirconium-bearing composite. That is, the corrosion rate of zirconium or zirconium-bearing compound or zirconium-bearing solid solution or zirconium-bearing composite in the molten NaCl-KCl salt at 727° C. in air will be significantly reduced if the NaCl-KCl salt is saturated with $ZrO_2$. Hence, a key aspect of the present disclosure is to provide a molten salt (such as a molten NaCl-KCl salt) at high temperatures (such as at 727° C.) and high oxygen partial pressures (such as air), with the molten salt possessing a dissolved concentration (up to the saturation concentration) of a corrosion product (such as dissolved $ZrO_2$), so as to dramatically lower the rate of corrosion of a zirconium or zirconium-bearing compound or zirconium-bearing solid solution or zirconium-bearing composite exposed to such a molten salt.

Figure 11:
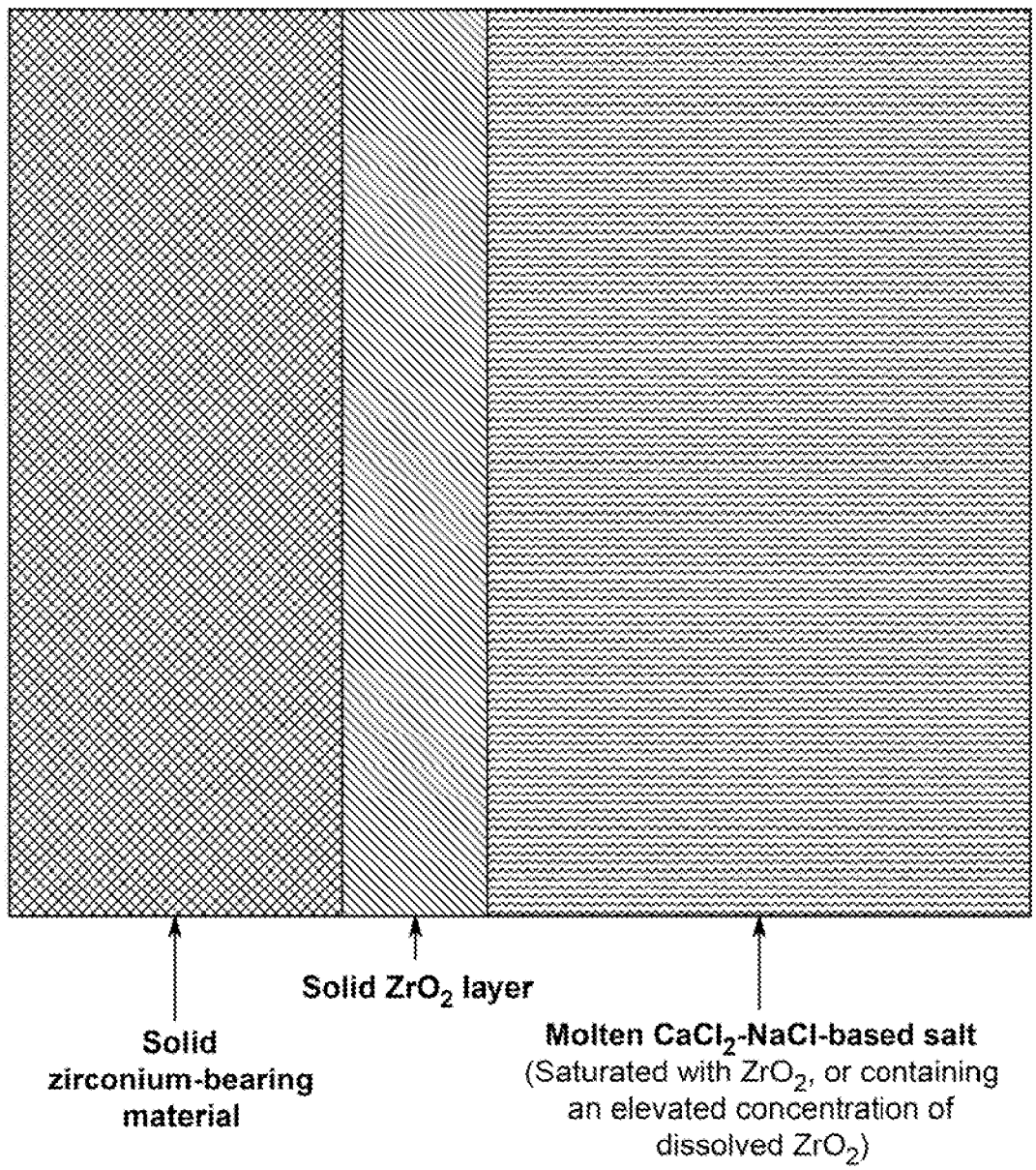
FIG. 11 is a schematic illustration of an example of this disclosure containing a solid zirconium-bearing material exposed to a molten $CaCl_2$-NaCl salt environment.

FIG. 11 is a schematic illustration of an example of this disclosure containing a solid zirconium-bearing material exposed to a molten $CaCl_2$-NaCl salt environment. Referring to FIG. 11, a solid zirconium or zirconium-bearing metallic alloy has a solid $ZrO_2$ layer or scale such that the scale is in contact with molten $CaCl_2$-NaCl salt saturated with $ZrO_2$, or containing an elevated concentration of dissolved $ZrO_2$. In FIG. 11, the bold vertical lines are used to denote the interfaces between a solid material and a solid product layer or between a solid product layer and a liquid. The solid $ZrO_2$ layer can be formed upon exposure of the Zr-bearing solid material to a suitable gaseous atmosphere and/or to $ZrO_2$-saturated or $ZrO_2$-enriched molten $CaCl_2$-NaCl salt environment, provided the molten salt contains an adequate amount of oxygen and/or water to create the $ZrO_2$ layer. Consider, as a ninth non-limiting example, a zirconium or a zirconium-bearing compound or a zirconium-bearing solid solution or a zirconium-bearing composite. Consider further that this a zirconium or a zirconium-bearing compound or a zirconium-bearing solid solution or a zirconium-bearing composite is exposed to a molten salt, containing $CaCl_2$ and NaCl (such as a liquid solution containing 48 mole % $CaCl_2$ and 52 mole % NaCl), at 750° C. in air. The zirconium or a zirconium-bearing compound or a zirconium-bearing solid solution or a zirconium-bearing composite will dissolve into the $CaCl_2$-NaCl molten salt at 750° C. if the $CaCl_2$-NaCl salt is not saturated with $ZrO_2$. Such dissolution of a zirconium or a zirconium-bearing compound or a zirconium-bearing solid solution or a zirconium-bearing composite upon exposure to the $CaCl_2$-NaCl salt at 750° C. in air can be significantly reduced if the $CaCl_2$-NaCl salt is doped with $ZrO_2$ prior to exposure of the $ZrO_2$ or $ZrO_2$-bearing compound or $ZrO_2$-bearing solid solution or $ZrO_2$-bearing composite to this salt. That is, the corrosion rate of a zirconium or a zirconium-bearing compound or a zirconium-bearing solid solution or a zirconium-bearing composite in the molten $CaCl_2$-NaCl salt at 750° C. in air will be significantly reduced if the $CaCl_2$-NaCl salt is saturated with $ZrO_2$. Hence, a key aspect of the present disclosure is to provide a molten salt (such as a molten $CaCl_2$-NaCl salt) at high temperatures (such as at 750° C.) and high oxygen partial pressures (such as air), with the molten salt possessing a dissolved concentration (up to the saturation concentration) of a corrosion product (such as dissolved $ZrO_2$), so as to dramatically lower the rate of corrosion of a zirconium or a zirconium-bearing compound or a zirconium-bearing solid solution or a zirconium-bearing composite exposed to such a molten salt.

It should be recognized that the principles of this disclosure apply to solid materials that are not metallic. For example, the non-metallic solid material whose corrosion resistance, when exposed to molten salts needs enhancement, include but not limited to be non-metallic oxides, non-metallic compounds, non-metallic solid-solutions or a non-metallic composites and ceramic composite materials. In several of these cases, the corrosion product is the solid-material itself or one or more a constituents of the solid material. In these cases, if the corrosion product is the solid-material itself, there is no need to prepare a scale prior to exposing the material to the molten-salt environment. Several examples of utilizing the principles of this disclosure to enhance the hose corrosion resistance of non-metallic materials to molten salts are described below.

In one embodiment, of the disclosure, zirconia ($ZrO_2$) or a $ZrO_2$-bearing compound or a $ZrO_2$-bearing solid solution or a $ZrO_2$-bearing composite can be considered to be the solid material. Consider further that this $ZrO_2$ or $ZrO_2$-bearing compound or $ZrO_2$-bearing solid solution or $ZrO_2$-bearing composite is exposed to a molten salt, containing a mixture of NaCl and KCl (such as an equimolar mixture of NaCl and KCl), at 727° C. in air. The $ZrO_2$ or $ZrO_2$ in the $ZrO_2$-bearing compound or $ZrO_2$ in the $ZrO_2$-bearing solid solution or $ZrO_2$ in the $ZrO_2$-bearing composite will dissolve into the NaCl-KCl molten salt at 727° C. if the NaCl-KCl salt is not saturated with $ZrO_2$. Such dissolution of $ZrO_2$ or $ZrO_2$ in the $ZrO_2$-bearing compound or $ZrO_2$ in the $ZrO_2$-bearing solid solution or $ZrO_2$ in the $ZrO_2$-bearing composite upon exposure to the NaCl-KCl salt at 727° C. in air can be significantly reduced if the NaCl-KCl salt is doped with $ZrO_2$ prior to exposure of the $ZrO_2$ or $ZrO_2$-bearing compound or $ZrO_2$-bearing solid solution or $ZrO_2$-bearing composite to this salt. That is, the corrosion rate of $ZrO_2$ or $ZrO_2$-bearing compound or $ZrO_2$-bearing solid solution or $ZrO_2$-bearing composite in the molten NaCl-KCl salt at 727° C. in air will be significantly reduced if the NaCl-KCl salt is saturated with $ZrO_2$. Hence, a key aspect of the present disclosure is to provide a molten salt (such as a molten NaCl-KCl salt) at high temperatures (such as at 727° C.) and high oxygen partial pressures (such as air), with the molten salt possessing a dissolved concentration (up to the saturation concentration) of a corrosion product (such as dissolved $ZrO_2$), so as to dramatically lower the rate of corrosion of an oxide (such as $ZrO_2$) or an oxide-bearing compound (such as a $ZrO_2$-bearing compound) or an oxide-bearing solid solution (such as a $ZrO_2$-bearing solid solution) or an oxide-bearing composite (such as a $ZrO_2$-bearing composite) exposed to such a molten salt.

Consider, as yet another embodiment of the disclosure, zirconia ($ZrO_2$) or a $ZrO_2$-bearing compound or a $ZrO_2$-bearing solid solution or a $ZrO_2$-bearing composite exposed to a molten salt, containing $CaCl_2$ and NaCl (such as a liquid solution containing 48 mole % $CaCl_2$ and 52 mole % NaCl), at 750° C. in air. The $ZrO_2$ or $ZrO_2$ in the $ZrO_2$-bearing compound or $ZrO_2$ in the $ZrO_2$-bearing solid solution or $ZrO_2$ in the $ZrO_2$-bearing composite will dissolve into the $CaCl_2$-NaCl molten salt at 750° C. if the $CaCl_2$-NaCl salt is not saturated with $ZrO_2$. Such dissolution of $ZrO_2$ or $ZrO_2$ in the $ZrO_2$-bearing compound or $ZrO_2$ in the $ZrO_2$-bearing solid solution or $ZrO_2$ in the $ZrO_2$-bearing composite upon exposure to the $CaCl_2$-NaCl salt at 750° C. in air can be significantly reduced if the $CaCl_2$-NaCl salt is doped with $ZrO_2$ prior to exposure of the $ZrO_2$ or $ZrO_2$-bearing compound or $ZrO_2$-bearing solid solution or $ZrO_2$-bearing composite to this salt. That is, the corrosion rate of $ZrO_2$ or $ZrO_2$-bearing compound or $ZrO_2$-bearing solid solution or $ZrO_2$-bearing composite in the molten $CaCl_2$-NaCl salt at 750° C. in air will be significantly reduced if the $CaCl_2$-NaCl salt is saturated with $ZrO_2$. Hence, a key aspect of the present disclosure is to provide a molten salt (such as a molten $CaCl_2$-NaCl salt) at high temperatures (such as at 750° C.) and high oxygen partial pressures (such as air), with the molten salt possessing a dissolved concentration (up to the saturation concentration) of a corrosion product (such as dissolved $ZrO_2$), so as to dramatically lower the rate of corrosion of an oxide (such as $ZrO_2$) or an oxide-bearing compound (such as a $ZrO_2$-bearing compound) or an oxide-bearing solid solution (such as a $ZrO_2$-bearing solid solution) or an oxide-bearing composite (such as a $ZrO_2$-bearing composite) exposed to such a molten salt.

Consider, alumina ($Al_2O_3$) or an $Al_2O_3$-bearing compound or an $Al_2O_3$-bearing solid solution or an $Al_2O_3$-bearing composite. Consider further that this $Al_2O_3$ or $Al_2O_3$-bearing compound or $Al_2O_3$-bearing solid solution or $Al_2O_3$-bearing composite is exposed to a molten salt, containing a mixture of NaCl and KCl (such as an equimolar mixture of NaCl and KCl), at 727° C. in air. The $Al_2O_3$ or $Al_2O_3$ in the $Al_2O_3$-bearing compound or $Al_2O_3$ in the $Al_2O_3$-bearing solid solution or $Al_2O_3$ in the $Al_2O_3$-bearing composite will dissolve into the NaCl-KCl molten salt at 727° C. if the NaCl-KCl salt is not saturated with $Al_2O_3$. Such dissolution of $Al_2O_3$ or $Al_2O_3$ in the $Al_2O_3$-bearing compound or $Al_2O_3$ in the $Al_2O_3$-bearing solid solution or $Al_2O_3$ in the $Al_2O_3$-bearing composite upon exposure to the NaCl-KCl salt at 727° C. in air can be significantly reduced if the NaCl-KCl salt is doped with $Al_2O_3$ prior to exposure of the $Al_2O_3$ or $Al_2O_3$-bearing compound or $Al_2O_3$-bearing solid solution or $Al_2O_3$-bearing composite to this salt. That is, the corrosion rate of $Al_2O_3$ or $Al_2O_3$-bearing compound or $Al_2O_3$-bearing solid solution or $Al_2O_3$-bearing composite in the molten NaCl-KCl salt at 727° C. in air will be significantly reduced if the NaCl-KCl salt is saturated with $Al_2O_3$. Hence, a key aspect of the present disclosure is to provide a molten salt (such as a molten NaCl-KCl salt) at high temperatures (such as at 727° C.) and high oxygen partial pressures (such as air), with the molten salt possessing a dissolved concentration (up to the saturation concentration) of a corrosion product (such as dissolved $Al_2O_3$), so as to dramatically lower the rate of corrosion of an oxide (such as $Al_2O_3$) or an oxide-bearing compound (such as a $Al_2O_3$-bearing compound) or an oxide-bearing solid solution (such as a $Al_2O_3$-bearing solid solution) or an oxide-bearing composite (such as a $Al_2O_3$-bearing composite) exposed to such a molten salt.

Consider, alumina ($Al_2O_3$) or an $Al_2O_3$-bearing compound or an $Al_2O_3$-bearing solid solution or an $Al_2O_3$-bearing composite. Consider further that this $Al_2O_3$ or $Al_2O_3$-bearing compound or $Al_2O_3$-bearing solid solution or $Al_2O_3$-bearing composite is exposed to a molten salt, containing $CaCl_2$ and NaCl (such as a liquid solution containing 48 mole % $CaCl_2$ and 52 mole % NaCl), at 750° C. in air. The $Al_2O_3$ or $Al_2O_3$ in the $Al_2O_3$-bearing compound or $Al_2O_3$ in the $Al_2O_3$-bearing solid solution or $Al_2O_3$ in the $Al_2O_3$-bearing composite will dissolve into the $CaCl_2$-NaCl molten salt at 750° C. if the $CaCl_2$-NaCl salt is not saturated with $Al_2O_3$. Such dissolution of $Al_2O_3$ or $Al_2O_3$ in the $Al_2O_3$-bearing composite upon exposure to the $CaCl_2$-NaCl salt at 750° C. in air can be significantly reduced if the $CaCl_2$-NaCl salt is doped with $Al_2O_3$ prior to exposure of the $Al_2O_3$ or $Al_2O_3$-bearing compound or $Al_2O_3$-bearing solid solution or $Al_2O_3$-bearing composite to this salt. That is, the corrosion rate of $Al_2O_3$ or $Al_2O_3$-bearing compound or $Al_2O_3$-bearing solid solution or $Al_2O_3$-bearing composite in the molten $CaCl_2$-NaCl salt at 750° C. in air will be significantly reduced if the $CaCl_2$-NaCl salt is saturated with $Al_2O_3$. Hence, a key aspect of the present disclosure is to provide a molten salt (such as a molten $CaCl_2$-NaCl salt) at high temperatures (such as at 750° C.) and high oxygen partial pressures (such as air), with the molten salt possessing a dissolved concentration (up to the saturation concentration) of a corrosion product (such as dissolved $Al_2O_3$), so as to dramatically lower the rate of corrosion of an oxide (such as $Al_2O_3$) or an oxide-bearing compound (such as a $Al_2O_3$-bearing compound) or an oxide-bearing solid solution (such as a $Al_2O_3$-bearing solid solution) or an oxide-bearing composite (such as a $Al_2O_3$-bearing composite) exposed to such a molten salt.

Consider silica ($SiO_2$) or a $SiO_2$-bearing compound or a $SiO_2$-bearing solid solution or a $SiO_2$-bearing composite. Consider further that this $SiO_2$ or $SiO_2$-bearing compound or $SiO_2$-bearing solid solution or $SiO_2$-bearing composite is exposed to a molten salt, containing a mixture of NaCl and KCl (such as an equimolar mixture of NaCl and KCl), at 727° C. in air. The $SiO_2$ or $SiO_2$ in the $SiO_2$-bearing compound or $SiO_2$ in the $SiO_2$-bearing solid solution or $SiO_2$ in the $SiO_2$-bearing composite will dissolve into the NaCl-KCl molten salt at 727° C. if the NaCl-KCl salt is not saturated with $SiO_2$. Such dissolution of $SiO_2$ or $SiO_2$ in the $SiO_2$-bearing compound or $SiO_2$ in the $SiO_2$-bearing solid solution or $SiO_2$ in the $SiO_2$-bearing composite upon exposure to the NaCl-KCl salt at 727° C. in air can be significantly reduced if the NaCl-KCl salt is doped with $SiO_2$ prior to exposure of the $SiO_2$ or $SiO_2$-bearing compound or $SiO_2$-bearing solid solution or $SiO_2$-bearing composite to this salt. That is, the corrosion rate of $SiO_2$ or $SiO_2$-bearing compound or $SiO_2$-bearing solid solution or $SiO_2$-bearing composite in the molten NaCl-KCl salt at 727° C. in air will be significantly reduced if the NaCl-KCl salt is saturated with $SiO_2$. Hence, a key aspect of the present disclosure is to provide a molten salt (such as a molten NaCl-KCl salt) at high temperatures (such as at 727° C.) and high oxygen partial pressures (such as air), with the molten salt possessing a dissolved concentration (up to the saturation concentration) of a corrosion product (such as dissolved $SiO_2$), so as to dramatically lower the rate of corrosion of an oxide (such as $SiO_2$) or an oxide-bearing compound (such as a $SiO_2$-bearing compound) or an oxide-bearing solid solution (such as a $SiO_2$-bearing solid solution) or an oxide-bearing composite (such as a $SiO_2$-bearing composite) exposed to such a molten salt.

Consider silica ($SiO_2$) or a $SiO_2$-bearing compound or a $SiO_2$-bearing solid solution or a $SiO_2$-bearing composite. Consider further that this $SiO_2$ or $SiO_2$-bearing compound or $SiO_2$-bearing solid solution or $SiO_2$-bearing composite is exposed to a molten salt, containing $CaCl_2$ and NaCl (such as a liquid solution containing 48 mole % $CaCl_2$ and 52 mole % NaCl), at 750° C. in air. The $SiO_2$ or $SiO_2$ in the $SiO_2$-bearing compound or $SiO_2$ in the $SiO_2$-bearing solid solution or $SiO_2$ in the $SiO_2$-bearing composite will dissolve into the $CaCl_2$-NaCl molten salt at 750° C. if the $CaCl_2$-NaCl salt is not saturated with $SiO_2$. Such dissolution of $SiO_2$ or $SiO_2$ in the $SiO_2$-bearing compound or $SiO_2$ in the $SiO_2$-bearing solid solution or $SiO_2$ in the $SiO_2$-bearing composite upon exposure to the $CaCl_2$-NaCl salt at 750° C. in air can be significantly reduced if the $CaCl_2$-NaCl salt is doped with $SiO_2$ prior to exposure of the $SiO_2$ or $SiO_2$-bearing compound or $SiO_2$-bearing solid solution or $SiO_2$-bearing composite to this salt. That is, the corrosion rate of $SiO_2$ or $SiO_2$-bearing compound or $SiO_2$-bearing solid solution or $SiO_2$-bearing composite in the molten $CaCl_2$-NaCl salt at 750° C. in air will be significantly reduced if the $CaCl_2$-NaCl salt is saturated with $SiO_2$. Hence, a key aspect of the present disclosure is to provide a molten salt (such as a molten $CaCl_2$-NaCl salt) at high temperatures (such as at 750° C.) and high oxygen partial pressures (such as air), with the molten salt possessing a dissolved concentration (up to the saturation concentration) of a corrosion product (such as dissolved $SiO_2$), so as to dramatically lower the rate of corrosion of an oxide (such as $SiO_2$) or an oxide-bearing compound (such as a $SiO_2$-bearing compound) or an oxide-bearing solid solution (such as a $SiO_2$-bearing solid solution) or an oxide-bearing composite (such as a $SiO_2$-bearing composite) exposed to such a molten salt.

Consider chromia ($Cr_2O_3$) or a $Cr_2O_3$-bearing compound or a $Cr_2O_3$-bearing solid solution or a $Cr_2O_3$-bearing composite. Consider further that this $Cr_2O_3$ or $Cr_2O_3$-bearing compound or $Cr_2O_3$-bearing solid solution or $Cr_2O_3$-bearing composite is exposed to a molten salt, containing a mixture of NaCl and KCl (such as an equimolar mixture of NaCl and KCl), at 727° C. in air. The $Cr_2O_3$ or $Cr_2O_3$ in the $Cr_2O_3$-bearing compound or $Cr_2O_3$ in the $Cr_2O_3$-bearing solid solution or $Cr_2O_3$ in the $Cr_2O_3$-bearing composite will dissolve into the NaCl-KCl molten salt at 727° C. if the NaCl-KCl salt is not saturated with $Cr_2O_3$. Such dissolution of $Cr_2O_3$ or $Cr_2O_3$ in the $Cr_2O_3$-bearing compound or $Cr_2O_3$ in the $Cr_2O_3$-bearing solid solution or $Cr_2O_3$ in the $Cr_2O_3$-bearing composite upon exposure to the NaCl-KCl salt at 727° C. in air can be significantly reduced if the NaCl-KCl salt is doped with $Cr_2O_3$ prior to exposure of the $Cr_2O_3$ or $Cr_2O_3$-bearing compound or $Cr_2O_3$-bearing solid solution or $Cr_2O_3$-bearing composite to this salt. That is, the corrosion rate of $Cr_2O_3$ or $Cr_2O_3$-bearing compound or $Cr_2O_3$-bearing solid solution or $Cr_2O_3$-bearing composite in the molten NaCl-KCl salt at 727° C. in air will be significantly reduced if the NaCl-KCl salt is saturated with $Cr_2O_3$. Hence, a key aspect of the present disclosure is to provide a molten salt (such as a molten NaCl-KCl salt) at high temperatures (such as at 727° C.) and high oxygen partial pressures (such as air), with the molten salt possessing a dissolved concentration (up to the saturation concentration) of a corrosion product (such as dissolved $Cr_2O_3$), so as to dramatically lower the rate of corrosion of an oxide (such as $Cr_2O_3$) or an oxide-bearing compound (such as a $Cr_2O_3$-bearing compound) or an oxide-bearing solid solution (such as a $Cr_2O_3$-bearing solid solution) or an oxide-bearing composite (such as a $Cr_2O_3$-bearing composite) exposed to such a molten salt.

Consider chromia ($Cr_2O_3$) or a $Cr_2O_3$-bearing compound or a $Cr_2O_3$-bearing solid solution or a $Cr_2O_3$-bearing composite. Consider further that this $Cr_2O_3$ or $Cr_2O_3$-bearing compound or $Cr_2O_3$-bearing solid solution or $Cr_2O_3$-bearing composite is exposed to a molten salt, containing $CaCl_2$ and NaCl (such as a liquid solution containing 48 mole % $CaCl_2$ and 52 mole % NaCl), at 750° C. in air. The $Cr_2O_3$ or $Cr_2O_3$ in the $Cr_2O_3$-bearing compound or $Cr_2O_3$ in the $Cr_2O_3$-bearing solid solution or $Cr_2O_3$ in the $Cr_2O_3$-bearing composite will dissolve into the $CaCl_2$-NaCl molten salt at 750° C. if the $CaCl_2$-NaCl salt is not saturated with $Cr_2O_3$. Such dissolution of $Cr_2O_3$ or $Cr_2O_3$ in the $Cr_2O_3$-bearing compound or $Cr_2O_3$ in the $Cr_2O_3$-bearing solid solution or $Cr_2O_3$ in the $Cr_2O_3$-bearing composite upon exposure to the $CaCl_2$-NaCl salt at 750° C. in air can be significantly reduced if the $CaCl_2$-NaCl salt is doped with $Cr_2O_3$ prior to exposure of the $Cr_2O_3$ or $Cr_2O_3$-bearing compound or $Cr_2O_3$-bearing solid solution or $Cr_2O_3$-bearing composite to this salt. That is, the corrosion rate of $Cr_2O_3$ or $Cr_2O_3$-bearing compound or $Cr_2O_3$-bearing solid solution or $Cr_2O_3$-bearing composite in the molten $CaCl_2$-NaCl salt at 750° C. in air will be significantly reduced if the $CaCl_2$-NaCl salt is saturated with $Cr_2O_3$. Hence, a key aspect of the present disclosure is to provide a molten salt (such as a molten $CaCl_2$-NaCl salt) at high temperatures (such as at 750° C.) and high oxygen partial pressures (such as air), with the molten salt possessing a dissolved concentration (up to the saturation concentration) of a corrosion product (such as dissolved $Cr_2O_3$), so as to dramatically lower the rate of corrosion of an oxide (such as $Cr_2O_3$) or an oxide-bearing compound (such as a $Cr_2O_3$-bearing compound) or an oxide-bearing solid solution (such as a $Cr_2O_3$-bearing solid solution) or an oxide-bearing composite (such as a $Cr_2O_3$-bearing composite) exposed to such a molten salt.

The general method described above (i.e., the doping, at or below the saturation limit, of a molten salt with an oxide, or other corrosion product, so as to reduce or avoid the dissolution of the solid oxide, or other solid corrosion product, present on the surface of a solid material in contact with the molten salt) may also be conducted with molten salts and solid materials placed in contact with each other at temperatures other than 727° C. or 750° C. and in gaseous atmospheres other than air. This method may be applied to molten salts and solid materials placed in contact with each other at temperatures above the melting point of the molten salt and below the decomposition temperature or boiling point of the molten salt. This method may be applied to molten salts and solid materials placed in contact with each other in gaseous atmospheres with lower oxygen contents than is present in air (i.e., at oxygen partial pressures below 0.21 atmospheres) or in gaseous atmospheres with higher oxygen contents than is present in air (i.e., at oxygen partial pressures above 0.21 atmospheres). Some non-limiting examples of the use of this method at temperatures other than 727° C. or 750° C. and in gaseous atmospheres other than air are provided below.

Figure 12:
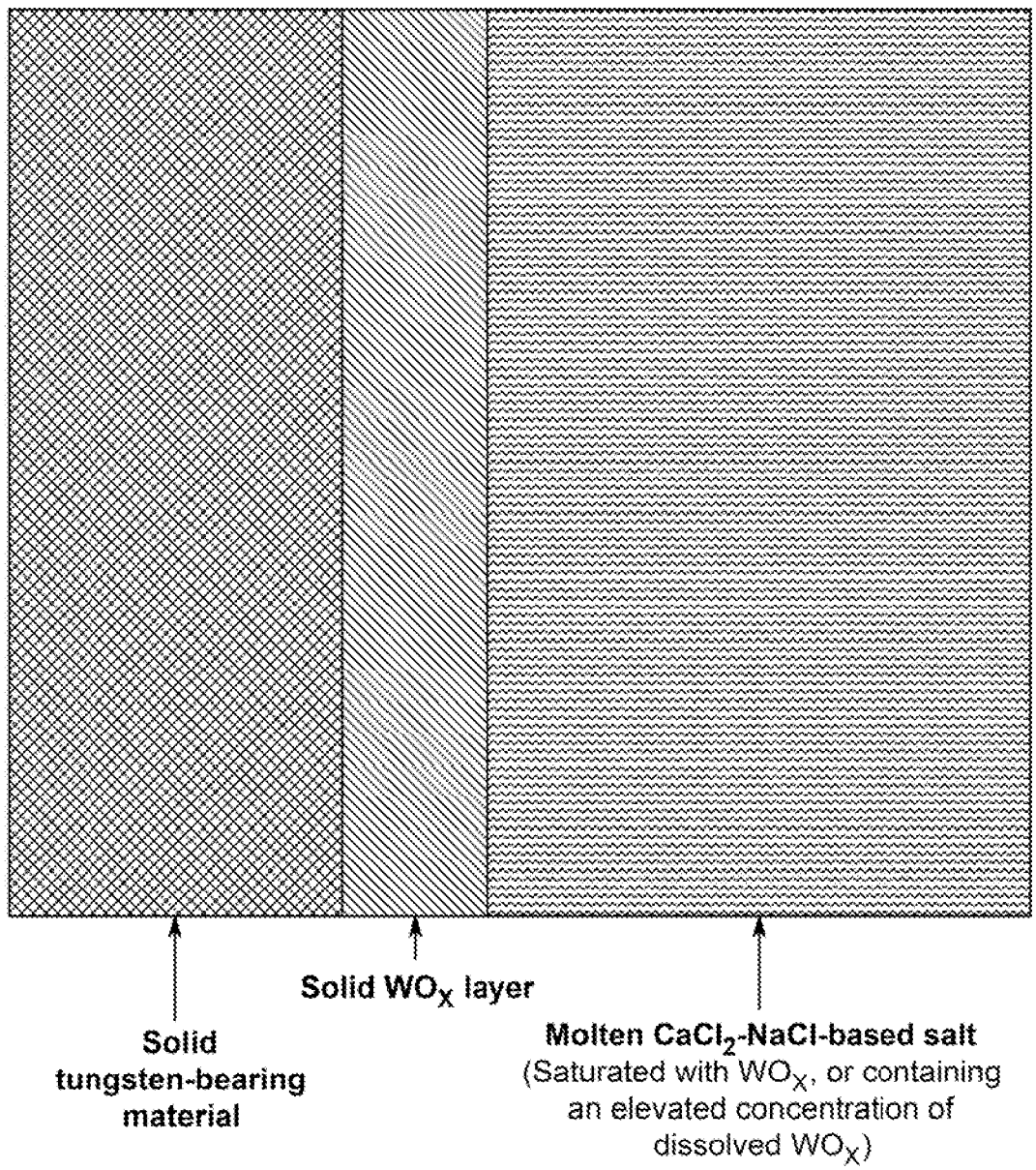
FIG. 12 is a schematic illustration of an example of this disclosure containing a solid tungsten-bearing material exposed to a molten $CaCl_2$-NaCl salt environment.

FIG. 12 is a schematic illustration of an example of this disclosure containing a solid tungsten-bearing material exposed to a molten $CaCl_2$-NaCl salt environment. Referring to FIG. 12, a solid tungsten or tungsten-bearing metallic alloy has a solid $WO_x$ (tungsten oxide, where x can vary between 2.0 and 3.0) layer or scale such that the scale is in contact with molten $CaCl_2$-NaCl salt saturated with $WO_x$, or containing an elevated concentration of dissolved $WO_x$. In FIG. 12, the bold vertical lines are used to denote the interfaces between a solid material and a solid product layer or between a solid product layer and a liquid. The solid $WO_x$ layer can be formed upon exposure of the W-bearing solid material to a suitable gaseous atmosphere and/or to $WO_x$-saturated or $WO_x$-enriched molten $CaCl_2$-NaCl salt, provided the molten salt contains an adequate amount of oxygen and/or water to create the $WO_x$ layer. Consider, a tungsten or a tungsten-bearing metallic alloy or a tungsten-bearing composite capable of forming an external $WO_x$ scale (where x can vary between 2.0 and 3.0) upon exposure to an oxygen-bearing gaseous atmosphere at 800° C. Consider that this oxygen-bearing gaseous atmosphere includes, but, is not limited to, an inert gas (including, but not limited to, argon or helium) containing a small amount of oxygen (well below the oxygen content of air including, but not limited to, less than 10 parts per million of oxygen or less than 1 part per million of oxygen) or a reducing gas (including, but not limited to, a hydrogen-argon gas mixture or a hydrogen-water vapor gas mixture or a carbon monoxide-argon gas mixture or a carbon monoxide-carbon dioxide gas mixture) containing a small amount of oxygen (well below the oxygen content of air including, but not limited to, less than 10 parts per million of oxygen or less than 1 part per million of oxygen or less than $10^{-10}$ atmospheres of oxygen or less than $10^{-15}$ atmospheres of oxygen or less than $10^{-20}$ atmospheres of oxygen). Consider further that this tungsten or tungsten-bearing metallic alloy or tungsten-bearing composite is exposed to a molten salt, containing $CaCl_2$ and NaCl (such as a liquid solution containing 48 mole % $CaCl_2$ and 52 mole % NaCl), at 800° C. in an oxygen-bearing atmosphere containing a small amount of oxygen. If the tungsten or tungsten-bearing metallic alloy or tungsten-bearing composite is pre-oxidized so as to form an external $WO_x$ scale, or if the tungsten or tungsten-bearing metallic alloy or tungsten-bearing composite initially forms an external $WO_x$ scale upon exposure to the $CaCl_2$-NaCl molten salt at 800° C. in the oxygen-bearing gaseous environment, then the $WO_x$ scale present on the tungsten or tungsten-bearing alloy or tungsten-bearing composite will also dissolve into the $CaCl_2$-NaCl molten salt at 800° C. if the $CaCl_2$-NaCl salt is not saturated with $WO_x$. Such dissolution of $WO_x$ in the molten salt will result in a thinning of the $WO_x$ scale present on the tungsten surface or tungsten-bearing metallic alloy surface or tungsten-bearing composite surface which, in turn, will require an enhanced rate of oxidation of the tungsten or the tungsten in the tungsten-bearing metallic alloy or the tungsten in the tungsten-bearing composite (relative to rate of oxidation of tungsten or the tungsten-bearing metallic alloy or the tungsten-bearing composite in the low oxygen gaseous environment in the absence of the salt) in order to maintain a continuous $WO_x$ scale of the same thickness on the tungsten surface or the tungsten-bearing metal alloy surface or the tungsten-bearing composite surface. Such an enhanced rate of oxidation of tungsten will enhance the rate of consumption of tungsten or tungsten in the tungsten-bearing alloy or tungsten in the tungsten-bearing composite and result in an undesired increase in the rate of corrosion of the tungsten or tungsten-bearing alloy or tungsten-bearing composite. Such enhanced oxidation of tungsten or tungsten in the metallic alloy or tungsten in the tungsten-bearing composite upon exposure to the molten $CaCl_2$-NaCl salt at 800° C. in the low oxygen gaseous environment can be significantly reduced if the molten $CaCl_2$-NaCl salt is doped with $WO_x$ prior to exposure of the tungsten or tungsten-bearing alloy or tungsten-bearing composite to this salt. Hence, exposure of tungsten or tungsten-bearing metal alloy or a tungsten-bearing composite in the low oxygen gaseous environment to a molten $CaCl_2$-NaCl salt that has been saturated with $WO_x$ at 800° C. will allow for the formation of a $WO_x$ scale on tungsten or on the tungsten-bearing metallic alloy or on the tungsten-bearing composite without the subsequent dissolution of this $WO_x$ scale in the $WO_x$-saturated $CaCl_2$-NaCl salt. That is, the corrosion rate of tungsten, a tungsten-bearing metallic alloy, or a tungsten-bearing composite (coated with a $WO_x$ scale) in the molten $CaCl_2$-NaCl salt at 800° C. in a low oxygen gaseous environment will be significantly reduced if the molten $CaCl_2$-NaCl salt is saturated with a modest $WO_x$ addition. Such a low $WO_x$ addition to the molten $CaCl_2$-NaCl salt is also not expected to result in a significant change in the desired thermal properties (e.g., heat capacity, density, viscosity, thermal stability) of the salt for use as a heat transfer fluid or as a thermal storage fluid. Hence, a key aspect of the present disclosure is to provide a molten salt (such as a molten $CaCl_2$-NaCl salt) at high temperatures (such as at 800° C.) and low oxygen partial pressures (such as provided by an inert gas with a small amount of oxygen or a reducing gas with a small amount of oxygen), with the molten salt possessing a dissolved concentration (up to the saturation concentration) of a corrosion product (such as dissolved $WO_x$), so as to dramatically lower the rate of corrosion of a metal (such as tungsten) or a metallic alloy (such as a tungsten-bearing alloy that is capable of forming an external $WO_x$ scale) or a metal-bearing composite (such as a tungsten-bearing composite that is capable of forming an external $WO_x$ scale) exposed to such a molten salt.

Figure 13:
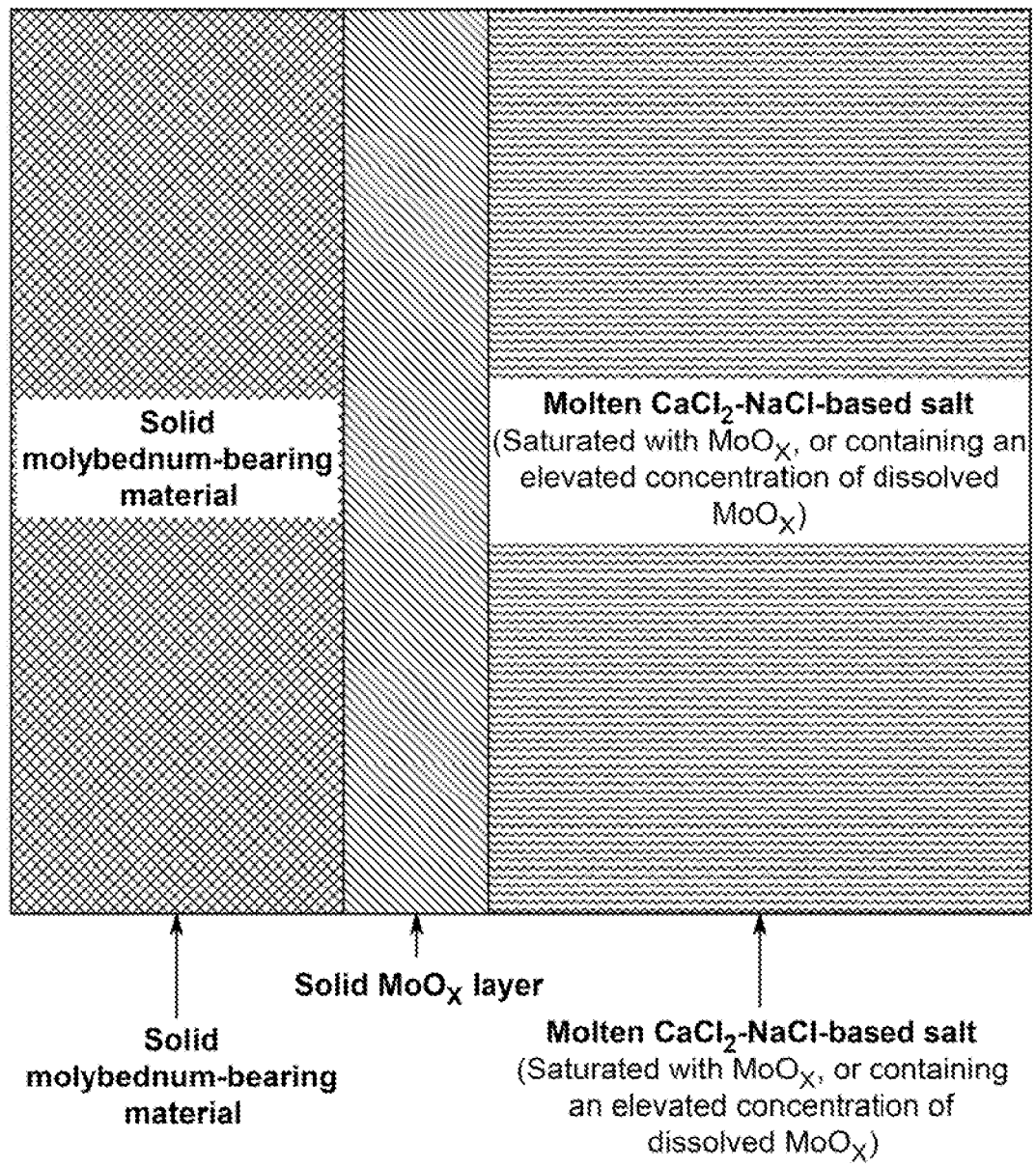
FIG. 13 is a schematic illustration of an example of this disclosure containing a solid molybdenum-bearing material exposed to a molten $CaCl_2$-NaCl salt environment.

FIG. 13 is a schematic illustration of an example of this disclosure containing a solid molybdenum-bearing material exposed to a molten $CaCl_2$-NaCl salt environment. Referring to FIG. 13, a solid molybdenum or molybdenum-bearing metallic alloy has a solid $MoO_x$ (molybdenum oxide, where x can vary between 2.0 and 3.0) layer or scale such that the scale is in contact with molten $CaCl_2$-NaCl salt saturated with $MoO_x$, or containing an elevated concentration of dissolved $MoO_x$. In FIG. 13, the bold vertical lines are used to denote the interfaces between a solid material and a solid product layer or between a solid product layer and a liquid. The solid $MoO_x$ layer can be formed upon exposure of the Mo-bearing solid material to a suitable gaseous atmosphere and/or to $MoO_x$-saturated or $MoO_x$-enriched molten $CaCl_2$-NaCl salt, provided the molten salt contains an adequate amount of oxygen and/or water to create the $MoO_x$ layer. Consider, as a seventeenth non-limiting example, molybdenum or a molybdenum-bearing metallic alloy or a molybdenum-bearing composite capable of forming an external $MO_x$ scale (with x can vary between 2.0 and 3.0) upon exposure to an oxygen-bearing gaseous atmosphere at 800° C. Consider that this oxygen-bearing gaseous atmosphere includes, but, is not limited to, an inert gas (including, but not limited to, argon or helium) containing a small amount of oxygen (well below the oxygen content of air including, but not limited to, less than 10 parts per million of oxygen or less than 1 part per million of oxygen) or a reducing gas (including, but not limited to, a hydrogen-argon gas mixture or a hydrogen-water vapor gas mixture or a carbon monoxide-argon gas mixture or a carbon monoxide-carbon dioxide gas mixture) containing a small amount of oxygen (well below the oxygen content of air including, but not limited to, less than 10 parts per million of oxygen or less than 1 part per million of oxygen or less than $10^{-10}$ atmospheres of oxygen or less than $10^{-15}$ atmospheres of oxygen or less than $10^{-20}$ atmospheres of oxygen). Consider further that this molybdenum or molybdenum-bearing metallic alloy or molybdenum-bearing composite is exposed to a molten salt, containing $CaCl_2$ and NaCl (such as a liquid solution containing 48 mole % $CaCl_2$ and 52 mole % NaCl), at 800° C. in an oxygen-bearing atmosphere containing a small amount of oxygen. If the molybdenum or molybdenum-bearing metallic alloy or molybdenum-bearing composite is pre-oxidized so as to form an external $MoO_x$ scale, or if the molybdenum or molybdenum-bearing metallic alloy or molybdenum-bearing composite initially forms an external $MoO_x$ scale upon exposure to the $CaCl_2$-NaCl molten salt at 800° C. in the oxygen-bearing gaseous environment, then the $MoO_x$ scale present on the molybdenum or molybdenum-bearing alloy or molybdenum-bearing composite will also dissolve into the $CaCl_2$-NaCl molten salt at 800° C. if the $CaCl_2$-NaCl salt is not saturated with $MoO_x$. Such dissolution of $MoO_x$ in the molten salt will result in a thinning of the $MoO_x$ scale present on the molybdenum surface or molybdenum-bearing metallic alloy surface or molybdenum-bearing composite surface which, in turn, will require an enhanced rate of oxidation of the molybdenum or the molybdenum in the molybdenum-bearing metallic alloy or the molybdenum in the molybdenum-bearing composite (relative to rate of oxidation of molybdenum or the molybdenum-bearing metallic alloy or the molybdenum-bearing composite in the low oxygen gaseous environment in the absence of the salt) in order to maintain a continuous $MoO_x$ scale of the same thickness on the molybdenum surface or the molybdenum-bearing metal alloy surface or the molybdenum-bearing composite surface. Such an enhanced rate of oxidation of molybdenum will enhance the rate of consumption of molybdenum or molybdenum in the molybdenum-bearing alloy or molybdenum in the molybdenum-bearing composite and result in an undesired increase in the rate of corrosion of the molybdenum or molybdenum-bearing alloy or molybdenum-bearing composite. Such enhanced oxidation of molybdenum or molybdenum in the metallic alloy or molybdenum in the molybdenum-bearing composite upon exposure to the molten $CaCl_2$-NaCl salt at 800° C. in the low oxygen gaseous environment can be significantly reduced if the molten $CaCl_2$-NaCl salt is doped with $MoO_x$ prior to exposure of the molybdenum or molybdenum-bearing alloy or molybdenum-bearing composite to this salt. Hence, exposure of molybdenum or molybdenum-bearing metal alloy or a molybdenum-bearing composite in the low oxygen gaseous environment to a molten $CaCl_2$-NaCl salt that has been saturated with $MoO_x$ at 800° C. will allow for the formation of a $MoO_x$ scale on molybdenum or on the molybdenum-bearing metallic alloy or on the molybdenum-bearing composite without the subsequent dissolution of this $MoO_x$ scale in the $MoO_x$-saturated $CaCl_2$-NaCl salt. That is, the corrosion rate of molybdenum, a molybdenum-bearing metallic alloy, or a molybdenum-bearing composite (coated with a $MoO_x$ scale) in the molten $CaCl_2$-NaCl salt at 800° C. in a low oxygen gaseous environment will be significantly reduced if the molten $CaCl_2$-NaCl salt is saturated with a modest $MoO_x$ addition. Such a low $MoO_x$ addition to the molten $CaCl_2$-NaCl salt is also not expected to result in a significant change in the desired thermal properties (e.g., heat capacity, density, viscosity, thermal stability) of the salt for use as a heat transfer fluid or as a thermal storage fluid. Hence, a key aspect of the present disclosure is to provide a molten salt (such as a molten $CaCl_2$-NaCl salt) at high temperatures (such as at 800° C.) and low oxygen partial pressures (such as provided by an inert gas with a small amount of oxygen or a reducing gas with a small amount of oxygen), with the molten salt possessing a dissolved concentration (up to the saturation concentration) of a corrosion product (such as dissolved $MoO_x$), so as to dramatically lower the rate of corrosion of a metal (such as molybdenum) or a metallic alloy (such as a molybdenum-bearing alloy that is capable of forming an external $MoO_x$ scale) or a metal-bearing composite (such as a molybdenum-bearing composite that is capable of forming an external $MoO_x$ scale) exposed to such a molten salt.

Consider, as another non-limiting example, zirconium carbide or a zirconium carbide-bearing compound or a zirconium carbide-bearing solid solution or a zirconium carbide-bearing composite capable of forming an external $ZrO_2$-bearing scale upon exposure to an oxygen-bearing gaseous atmosphere at 800° C. Consider that this oxygen-bearing gaseous atmosphere includes, but, is not limited to, an inert gas (including, but not limited to, argon or helium) containing a small amount of oxygen (well below the oxygen content of air including, but not limited to, less than 10 parts per million of oxygen or less than 1 part per million of oxygen) or a reducing gas (including, but not limited to, a hydrogen-argon gas mixture or a hydrogen-water vapor gas mixture or a carbon monoxide-argon gas mixture or a carbon monoxide-carbon dioxide gas mixture) containing a small amount of oxygen (well below the oxygen content of air including, but not limited to, less than 10 parts per million of oxygen or less than 1 part per million of oxygen or less than $10^{-10}$ atmospheres of oxygen or less than $10^{-15}$ atmospheres of oxygen or less than $10^{-20}$ atmospheres of oxygen). Consider further that this zirconium carbide or a zirconium carbide-bearing compound or a zirconium carbide-bearing solid solution or a zirconium carbide-bearing composite is exposed to a molten salt, containing $CaCl_2$ and NaCl (such as a liquid solution containing 48 mole % $CaCl_2$ and 52 mole % NaCl), at 800° C. in an oxygen-bearing atmosphere containing a small amount of oxygen. If the zirconium carbide or a zirconium carbide-bearing compound or a zirconium carbide-bearing solid solution or a zirconium carbide-bearing composite is pre-oxidized so as to form an external $ZrO_2$-bearing scale, or if the zirconium carbide or a zirconium carbide-bearing compound or a zirconium carbide-bearing solid solution or a zirconium carbide-bearing composite initially forms an external $ZrO_2$-bearing scale upon exposure to the $CaCl_2$-NaCl molten salt at 800° C. in the oxygen-bearing gaseous environment, then the $ZrO_2$-bearing scale present on the zirconium carbide or a zirconium carbide-bearing compound or a zirconium carbide-bearing solid solution or a zirconium carbide-bearing composite will also dissolve into the $CaCl_2$-NaCl molten salt at 800° C. if the $CaCl_2$-NaCl salt is not saturated with $ZrO_2$. Such dissolution of $ZrO_2$ in the molten salt will result in a thinning of the $ZrO_2$-bearing scale present on the zirconium carbide surface or a zirconium carbide-bearing compound surface or a zirconium carbide-bearing solid solution surface or a zirconium carbide-bearing composite surface which, in turn, will require an enhanced rate of oxidation of the zirconium carbide or zirconium carbide in the zirconium carbide-bearing compound or zirconium carbide in the zirconium carbide-bearing solid solution or zirconium carbide in the zirconium carbide-bearing composite (relative to rate of oxidation of zirconium carbide or zirconium carbide-bearing compound or zirconium carbide-bearing solid solution or zirconium carbide-bearing composite in the low oxygen gaseous environment in the absence of the salt) in order to maintain a continuous $ZrO_2$-bearing scale of the same thickness on the zirconium carbide surface or a zirconium carbide-bearing compound surface or a zirconium carbide-bearing solid solution surface or a zirconium carbide-bearing composite surface. Such an enhanced rate of oxidation of zirconium carbide will enhance the rate of consumption of zirconium carbide or zirconium carbide in the zirconium carbide-bearing compound or zirconium carbide in the zirconium carbide-bearing solid solution or zirconium carbide in the zirconium carbide-bearing composite and result in an undesired increase in the rate of corrosion of the zirconium carbide or a zirconium carbide-bearing compound or a zirconium carbide-bearing solid solution or a zirconium carbide-bearing composite. Such enhanced oxidation of zirconium carbide or zirconium carbide in the zirconium carbide-bearing compound or zirconium carbide in the zirconium carbide-bearing solid solution or zirconium carbide in the zirconium carbide-bearing composite upon exposure to the molten $CaCl_2$-NaCl salt at 800° C. in the low oxygen gaseous environment can be significantly reduced if the molten $CaCl_2$-NaCl salt is doped with $ZrO_2$ prior to exposure of the zirconium carbide or a zirconium carbide-bearing compound or a zirconium carbide-bearing solid solution or a zirconium carbide-bearing composite to this salt. Hence, exposure of zirconium carbide or a zirconium carbide-bearing compound or a zirconium carbide-bearing solid solution or a zirconium carbide-bearing composite in the low oxygen gaseous environment to a molten $CaCl_2$-NaCl salt that has been saturated with $ZrO_2$ at 800° C. will allow for the formation of a $ZrO_2$-bearing scale on zirconium carbide or a zirconium carbide-bearing compound or a zirconium carbide-bearing solid solution or a zirconium carbide-bearing composite without the subsequent dissolution of this $ZrO_2$-bearing scale in the $ZrO_2$- saturated $CaCl_2$-NaCl salt. That is, the corrosion rate of zirconium carbide or a zirconium carbide-bearing compound or a zirconium carbide-bearing solid solution or a zirconium carbide-bearing composite (coated with a $ZrO_2$-bearing scale) in the molten $CaCl_2$-NaCl salt at 800° C. in a low oxygen gaseous environment will be significantly reduced if the molten $CaCl_2$-NaCl salt is saturated with a modest $ZrO_2$ addition. Such a low $ZrO_2$ addition to the molten $CaCl_2$-NaCl salt is also not expected to result in a significant change in the desired thermal properties (e.g., heat capacity, density, viscosity, thermal stability) of the salt for use as a heat transfer fluid or as a thermal storage fluid. Hence, a key aspect of the present disclosure is to provide a molten salt (such as a molten $CaCl_2$-NaCl salt) at high temperatures (such as at 800° C.) and low oxygen partial pressures (such as provided by an inert gas with a small amount of oxygen or a reducing gas with a small amount of oxygen), with the molten salt possessing a dissolved concentration (up to the saturation concentration) of a corrosion product (such as dissolved $ZrO_2$), so as to dramatically lower the rate of corrosion of a ceramic (such as zirconium carbide) or a ceramic solid solution (such as a zirconium carbide-bearing solid solution that is capable of forming an external $ZrO_2$-bearing scale) or a zirconium-bearing compound (such as a zirconium carbide-bearing compound that is capable of forming an external $ZrO_2$-bearing scale) or a zirconium-bearing composite (such as a zirconium carbide-bearing composite that is capable of forming an external $ZrO_2$-bearing scale) exposed to such a molten salt.

It should be noted that oxide-bearing molten salts, that are not saturated with the desired oxide corrosion product, may also be used to reduce the thermodynamic driving force for dissolution of the solid oxide so as to thereby significantly slow the rate of dissolution of the solid oxide into the molten salt. This concept is another feature of this disclosure. For example, chromium or a chromium-bearing metallic alloy (such as a nickel-based chromium-bearing alloy including, but not limited to, Haynes 230 or Hastelloy C276 or Hastelloy C22 or Inconel 740H; or an iron-based chromium-bearing alloy including, but not limited to, a stainless steel alloy such as 304 stainless steel or 316 stainless steel; or a cobalt-based chromium-bearing alloy) or a chromium-bearing composite capable of forming an external $Cr_2O_3$ scale upon exposure to air at 727° C., with this $Cr_2O_3$ scale exhibiting a thickening rate that decreases with increasing time of exposure to air at 727° C. Consider further that this chromium or chromium-bearing metallic alloy or chromium-bearing composite is exposed to a molten salt, containing a mixture of NaCl and KCl (such as an equimolar mixture of NaCl and KCl), at 727° C. in air. If the chromium or chromium-bearing metallic alloy or chromium-bearing composite is pre-oxidized in air at 727° C. to form an external $Cr_2O_3$ scale, or if the chromium or chromium-bearing metallic alloy or chromium-bearing composite initially forms an external $Cr_2O_3$ scale upon exposure to the NaCl-KCl molten salt at 727° C. in an air environment, then the $Cr_2O_3$ scale present on the chromium or chromium-bearing alloy or chromium-bearing composite will also dissolve into the NaCl-KCl molten salt at 727° C. if the NaCl-KCl salt is not saturated with $Cr_2O_3$. It has been reported in literature that the solubility of $Cr_2O_3$ in a molten NaCl-KCl salt at 727° C. is less than 1 wt %. Hence, exposure of chromium or chromium-bearing metal alloy or a chromium-bearing composite in air to a molten NaCl-KCl salt that has been doped, but not saturated, with $Cr_2O_3$ (at a $Cr_2O_3$ concentration below 1 wt %) at 727° C. will allow for the formation of a $Cr_2O_3$ scale on chromium or on the chromium-bearing metallic alloy or on the chromium-bearing composite with a reduced rate of dissolution of this $Cr_2O_3$ scale in the $Cr_2O_3$-saturated NaCl-KCl salt. That is, the corrosion rate of chromium or a chromium-bearing metallic alloy or a chromium-bearing composite (coated with a $Cr_2O_3$ scale) in the molten NaCl-KCl salt at 727° C. in air will be significantly reduced if the molten NaCl-KCl salt is doped with a modest $Cr_2O_3$ addition below the saturation limit. Such a low $Cr_2O_3$ addition to the molten NaCl-KCl salt is also not expected to result in a significant change in the desired thermal properties (e.g., heat capacity, density, viscosity, thermal stability) of the salt for use as a heat transfer fluid or as a thermal storage fluid. Hence, a key aspect of the present disclosure is to provide a molten salt (such as a molten NaCl-KCl salt) at high temperatures (such as at 727° C.) and high oxygen partial pressures (such as air), with the molten salt possessing a dissolved concentration (below the saturation concentration) of a corrosion product (such as dissolved $Cr_2O_3$), so as to significantly lower the rate of corrosion of a metal (such as chromium) or a metallic alloy (such as a chromium-bearing alloy that is capable of forming an external $Cr_2O_3$ scale) or a metal-bearing composite (such as a chromium-bearing composite that is capable of forming an external $Cr_2O_3$ scale) exposed to such a molten salt.

The general method described above (i.e., the doping, at or below the saturation limit, of a molten salt with an oxide, or other corrosion product, so as to reduce or avoid the dissolution of the solid oxide, or other solid corrosion product, present on the surface of a solid material in contact with the molten salt) may also be conducted with molten salts containing other additives (including, but not limited to, other oxides) that act to reduce the solubility of the oxide corrosion product in the molten salt. For example, one or more oxides other than chromium oxide ($Cr_2O_3$), including, but not limited to, other acidic oxides than chromium oxide, may be added to a molten salt so as to reduce the solubility of chromium oxide ($Cr_2O_3$) in the molten salt. With the addition of these one or more oxides other than chromium oxide ($Cr_2O_3$) to the molten salt, the amount of chromium oxide ($Cr_2O_3$) in the molten salt required to saturate the molten salt with chromium oxide (so as to reduce or avoid the dissolution of chromium oxide present in chromium oxide or in a chromium oxide solid solution or in a chromium oxide-bearing compound or in a chromium oxide-bearing composite or in a chromium oxide-bearing scale formed on chromium or in a chromium oxide-bearing scale formed on a chromium-bearing metallic alloy or in a chromium oxide-bearing scale formed on a chromium-bearing composite) would be reduced.

In the examples described above which are illustrative of the principles of this disclosure, two molten salt mixtures have been mentioned. In some examples of the solid material both the NaCl-KCl mixture and $CaCl_2$-NaCl were included. In some other examples of the solid material, only one of these salt mixtures is included, however, it should be recognized that for all the solid materials mentioned in the examples, either of these two molten salt mixtures can be included.

Figure 14A:
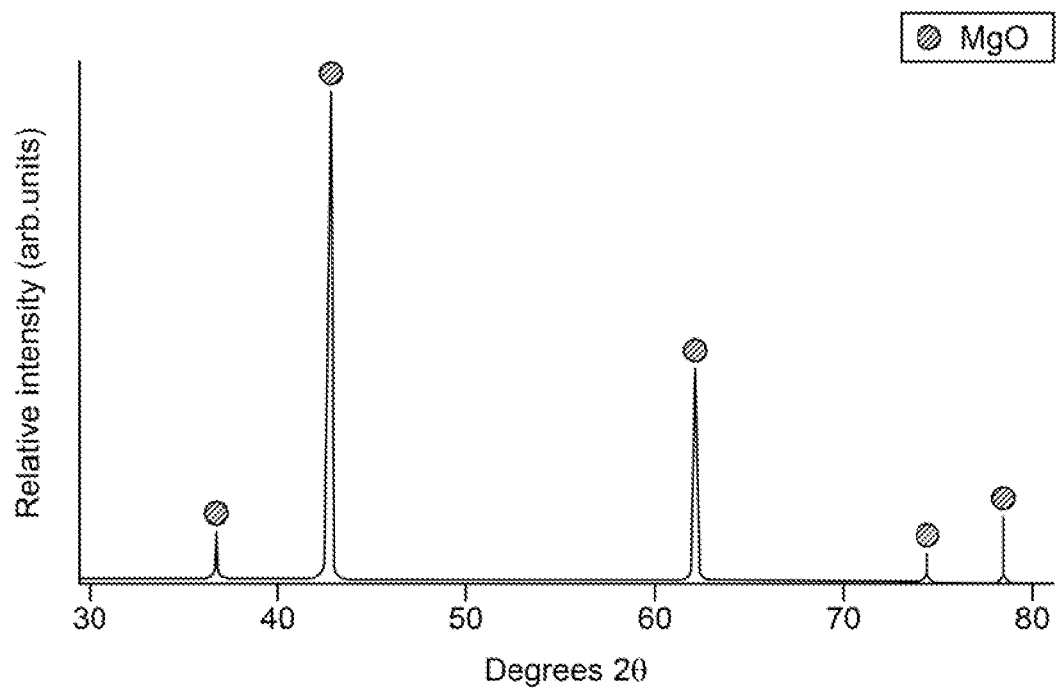
FIG. 14A shows X-ray diffraction (XRD) patterns obtained from solidified products generated after exposure to ambient air at 750° C. for 50 h of a 32 mol % $MgCl_2$/68 mol % KCl molten salt (the MgO product could be readily extracted from the solidified reacted melt.)
Figure 14B:
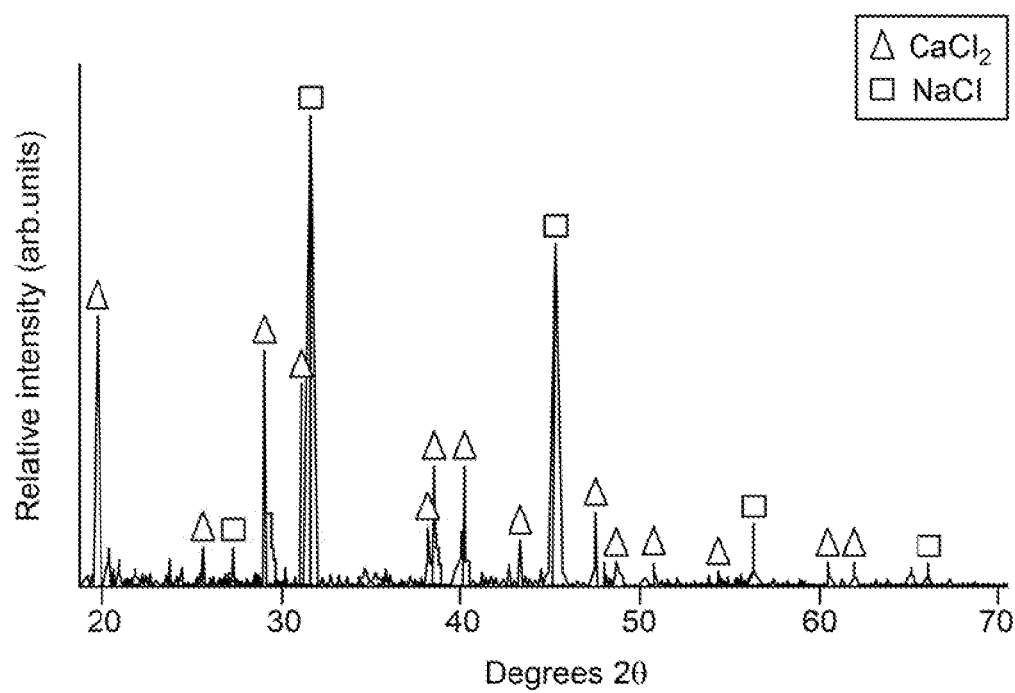
FIG. 14B shows X-ray diffraction (XRD) patterns obtained from solidified products generated after exposure to ambient air at 750° C. for 50 h of: b) a 53 mol % $CaCl_2$/47 mol % NaCl molten salt.

Preferred molten salt composition for this method of enhancing the corrosion resistance of solid materials in molten salts are $CaCl_2$-NaCl-based compositions. This salt composition is inexpensive, plentifully available ($CaCl_2$ and NaCl are readily obtained from sea water), and much more resistant to oxidation than $MgCl_2$-bearing chloride melts. Consider the oxidation reactions for chloride species in $MgCl_2$-KCl and $CaCl_2$-NaCl liquids:

$$\{MgCl_2\}+\tfrac{1}{2}O_2(g)=MgO(s)+2\{Cl\} \quad [1]$$

$$2\{KCl\}+\tfrac{1}{2}O_2(g)=K_2O(s)+2\{Cl\} \quad [2]$$

$$\{CaCl_2\}+\tfrac{1}{2}O_2(g)=CaO(s)+2\{Cl\} \quad [3]$$

$$2\{NaCl\}+\tfrac{1}{2}O_2(g)=Na_2O(s)+2\{Cl\} \quad [4]$$

where { } refers to species dissolved in the $MgCl_2$-KCl or $CaCl_2$-NaCl liquids. The standard Gibbs free energy changes ($\Delta G°$ values) for reactions [1], [2], [3], and [4] at 750° C. are −44.3 kJ/mol, +457.3 kJ/mol, +143.5 kJ/mol, and +356.2 kJ/mol, respectively; that is, $MgCl_2$ oxidation is much more strongly favored than the oxidation of KCl, $CaCl_2$, or NaCl. Indeed, recent experiments conducted as part of the experiments leading to this disclosure have shown that exposure of a 32 mol % $MgCl_2$/68 mol % KCl molten salt ($T_{eut}$=427° C.) to ambient air at 750° C. for 50 h resulted in the conversion of $MgCl_2$ to MgO (as confirmed by X-ray diffraction analysis. FIG. 14A shows X-ray diffraction (XRD) patterns obtained from solidified products generated after exposure to ambient air at 750° C. for 50 h of a 32 mol % $MgCl_2$/68 mol % KCl molten salt (the MgO product could be readily extracted from the solidified reacted melt) showing that the exposure resulted in the conversion of $MgCl_2$ to MgO. FIG. 14B shows X-ray diffraction (XRD) patterns obtained from solidified products generated after exposure to ambient air at 750° C. for 50 h of a 53 mol % $CaCl_2$/47 mol % NaCl molten salt, showing that the exposure did not result in detectable oxidation. Hence, $MgCl_2$-KCl melts are not thermodynamically stable in air or other high-oxygen-bearing environments at 750° C. Stable $CaCl_2$-NaCl melts should instead be used under such oxidizing conditions at ≥750° C. Using activity data reported for $CaCl_2$ for the eutectic 53 mol % $CaCl_2$/47 NaCl melt[2], the equilibrium ratio, $(a[Cl])^2/(p[O_2])^{1/2}$, for reaction [3] at 750° C. is found to be $2.3\times10^{-8}$. Consider the following displacement reaction:

$$NiO(s)+2\{Cl\}=\{NiCl_2\}+\tfrac{1}{2}O_2(g) \quad [5]$$

where { } refers to species dissolved in the $CaCl_2$-NaCl liquid. The $\Delta G°$ value for reaction [5] at 750° C. is −5.74 kJ/mol.[1] Equilibration of reaction [5] with the $(a[Cl])^2/(p[O_2])^{1/2}$ ratio of $2.3\times10^{-8}$ set by reaction [3] for the 53 mol % $CaCl_2$/47 mol % NaCl molten salt at 750° C. yields an activity for $\{NiCl_2\}$ dissolved in the salt of only $4.4\times10^{-8}$ (44 ppb). Hence, after extremely small amounts of reaction, NiO, should be thermodynamically stable with the eutectic $CaCl_2$-NaCl melt at 750° C. in air (or any $O_2$-bearing atmosphere).

Figure 15:
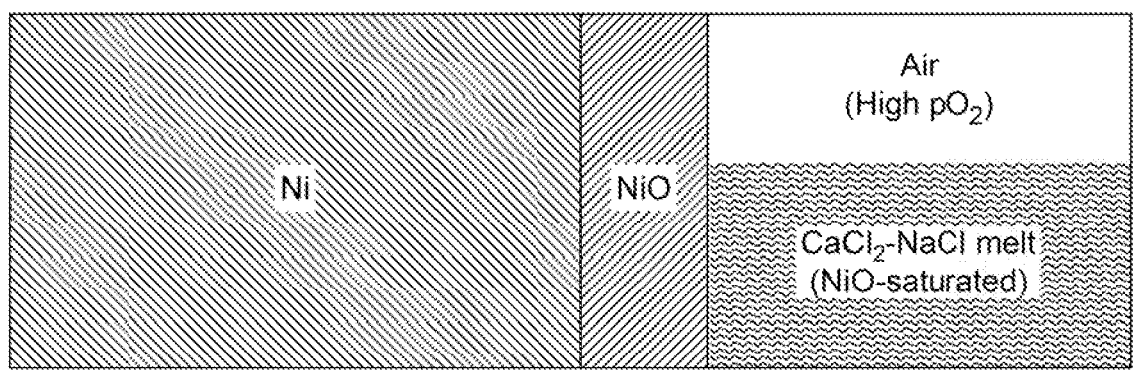
FIG. 15 shows a proposed a proposed strategy for achieving corrosion resistance of Ni as a non-limiting example (or any oxidizable material, including ceramics, metals, or metal alloys) in oxide-saturated $CaCl_2$-NaCl in oxidizing environments (air) at 750° C. (NiO saturation in this melt in air at 750° C. occurs at a very low concentration).

FIG. 15 shows a proposed a proposed strategy for achieving corrosion resistance of Ni as a non-limiting example (or any oxidizable material, including ceramics, metals, or metal alloys) in oxide-saturated $CaCl_2$-NaCl in oxidizing environments (air) at 750° C. (NiO saturation in this melt in air at 750° C. occurs at a very low concentration). Referring to FIG. 15, a Ni layer can be pre-oxidized and then exposed to the eutectic $CaCl_2$-NaCl melt in air at 750° C. Minimal reaction of the NiO with the $CaCl_2$-NaCl melt, should then render the NiO scale thermodynamically compatible with the $CaCl_2$-NaCl melt. In an oxidizing environment (e.g., air) at 750° C., the Ni layer on the ZrC/W will oxidize, but at a slow rate (e.g., the thickness of a coarse-grained NiO scale formed on Ni in air at 750° C. in 1 year should be <30 μm³). Hence, with this approach, the corrosion kinetics shift from fast dissolution of Ni or NiO in the chloride melt at 750° C. to much slower oxidation of Ni at 750° C. It should be noted that in FIG. 15, high p$O_2$ is to be understood to mean an oxygen partial pressure high enough to cause oxidation of the metal (in this case, nickel) at the prevailing temperature or the temperature at which oxidation of the metal (in this case, nickel) is desired.

This high-oxygen strategy, involving the exposure of an oxidizable material (such as Ni) to an oxygen-compatible chloride melt (such as a $CaCl_2$-NaCl melt) that is saturated with an oxide of the oxidizable material (such as NiO) may be applied to a variety of oxidizable materials (ceramics, metals, alloys of metals and/or ceramics). The basic concept is to shift from relatively fast corrosion that is rate-limited by dissolution in the molten chloride to a slower rate of corrosion that is rate-limited by the thickening of the oxide scale. This method may utilize oxidizable materials that form relatively slow-growing scales (e.g., oxidizable materials that form aluminum oxide, chromium oxide, silicon oxide, beryllium oxide, and/or nickel oxide scales) and utilizes molten salts that are saturated with respect to the slow-growing scale material.

This high-oxygen strategy is highly attractive for applications using molten chlorides for heat transfer and storage, because this corrosion mitigation method (for metal alloy piping, storage tanks, HEXs, etc.) is compatible with air at 750° C.; that is, leaks in pipes, storage tanks, and HEXs can be readily tolerated with this strategy.

From the above description, it is clear that this disclosure details a strategy for effectively eliminating or limiting the corrosion of an oxidizable material (a metal, a metallic alloy, a ceramic, a ceramic alloy, or combinations thereof) in contact with a high-temperature molten salt. For the case where the oxidizable material is a metal or metallic material, an oxide of the metal or metallic material is formed either prior to exposing the metal or metallic material to the corrosive molten salt or even during the exposure by maintaining adequate partial pressure of oxygen to form an oxide of the metal. The oxide of this metal then acts as barrier that slows the diffusion of oxygen anions or metal cations through the oxide layer. It should be recognized that the thickness of the oxide layer will directly correlate with the corrosion prevention due to the fact that the oxygen anions or metal cations must diffuse through the oxide layer to allow for further oxide formation. People skilled in the art will recognize that such diffusion through the dense, planar, adherent solid oxide layer follows a parabolic law and has a square root dependence on time. Thus the desired corrosion protection can be obtained through calculations or experiments and achieve a desired thickness for the oxide layer. As a non-limiting example, approaches and information relevant to the Ni-NiO oxide system can be found in the reference: S. Mrowec, Z. Grzesik, "Oxidation of Nickel and Transport Properties of Nickel Oxide," *J. Phys. Chem. Solids*, 65, 1651-1657 (2004). One of skill in the art can establish a correlation between the prevailing nickel-oxide (NiO) thickness and the corrosion protection provided which can be measured in terms of the metal consumption and/or the time required to replace a container made of the metal to hold a molten salt mixture due to corrosion. Those of skill in the art can utilize the oxide formation kinetics to obtain the desired thickness of the metal oxide.

While the detailed description above mainly described enhancement of corrosion resistance in molten salt mixtures, the general principles of the disclosure are applicable to any liquid that is likely to cause corrosion of the solid material and/or dissolution of the solid-product material.

Based on the foregoing description, it is an objective of this disclosure to describe a method for enhancing corrosion resistance of a solid material exposed to a liquid. The method includes providing a solid material whose corrosion resistance to a liquid is desired to be enhanced and which is capable of forming a solid product layer when exposed to the liquid containing chemical elements needed to react with the solid material to form the solid product layer; and maintaining the concentration of the solid product material in the liquid either at saturation level or at an elevated level. In some embodiments of the method, the liquid is a molten salt. The solid materials in the method can be metallic or non-metallic (such as, but not limited to, solid solutions of non-metallic elements or compounds or ceramic materials or ceramic composite materials). Examples of solid materials for the method include, but are not limited to, chromium, chromium-bearing material, aluminum, aluminum-bearing material, silicon, silicon-bearing material, beryllium, beryllium-bearing material, nickel, nickel-bearing material, iron, iron-bearing material, cobalt, cobalt-bearing material, copper, copper-bearing material, manganese, manganese-bearing material, titanium, titanium-bearing material, zirconium, zirconium-bearing material, hafnium, hafnium-bearing material, tungsten, tungsten-bearing material, molybdenum, molybdenum-bearing material, niobium, niobium-bearing material, vanadium, vanadium-bearing material, tantalum, tantalum-bearing material, yttrium, and yttrium-bearing material. In the method described above, the solid product material can be one or more materials taken from the group consisting of $Cr_2O_3$, $Al_2O_3$, $SiO_2$, BeO, NiO, FeO, $Fe_3O_4$, $Fe_2O_3$, CoO, $Co_2O_3$, $Cu_2O$, MnO, $Mn_3O_4$, CuO, $TiO_x$ (with $0<x\leq2$), $ZrO_x$ (with $0<x\leq2$), $HfO_x$ (with $0<x\leq2$), $WO_x$ (where x can vary between 2.0 and 3.0), $MoO_x$ (where x can vary between 2.0 and 3.0), $NbO_x$ (with $0<x\leq2.5$), $VO_x$ (with $0<x\leq2.5$), $TaO_x$ (with $0<x\leq2.5$), and $YO_x$ (with $0<x\leq1.5$). In some embodiments of the method, the molten salt is a molten salt solution. A molten salt solution refers herein to a single liquid salt phase that contains more than one molten salt species (e.g., a homogeneous liquid solution of NaCl and KCl). Examples of such molten salt solutions include but are not limited in the molten NaCl-KCl solution and molten $CaCl_2$-NaCl solution. In some embodiments of the method, the solid product can be non-metallic. In some embodiments, the solid product material is the non-metallic solid material itself or a constituent of the non-metallic solid material. In some embodiments of the method, the solid material can be non-metallic. Examples of solid materials of the methods of this disclosure that are non-metallic include but are not limited an oxide, an oxide bearing solid solution, or an oxide-bearing composite material. Examples of oxide materials that can comprise a solid material of this method can be, but not limited to, one or more of $Cr_2O_3$, $Al_2O_3$, $SiO_2$, BeO, NiO, FeO, $Fe_3O_4$, $Fe_2O_3$, CoO, $Co_2O_3$, $Cu_2O$, MnO, $Mn_3O_4$, CuO, $TiO_x$ (with $0<x\leq2$), $ZrO_x$ (with $0<x\leq2$), $HfO_x$ (with $0<x\leq2$), $WO_x$ (where x can vary between 2.0 and 3.0), $MoO_x$ (where x can vary between 2.0 and 3.0), $NbO_x$ (with $0<x\leq2.5$), $VO_x$ (with $0<x\leq2.5$), $TaO_x$ (with $0<x\leq2.5$), and $YO_x$ (with $0<x\leq1.5$).

It is another objective of this disclosure to describe a materials system for enhancing corrosion resistance of a solid material exposed to a liquid. The materials system includes a solid material capable of forming a solid product layer when exposed to air or a liquid environment containing dissolved oxygen and/or water at levels sufficient for oxidation of at least one constituent of the solid material, wherein the solid product layer is in contact with a liquid containing an elevated or saturated concentration of the dissolved solid product layer. A sufficient level of dissolved oxygen and/or water in the liquid environment refers to a concentration of oxygen and/or water dissolved in the liquid that is sufficient as to allow for the reaction of the solid material with the liquid at the temperature of interest so as to form the solid product layer on the solid material. In some embodiments of the materials system, the liquid is a molten salt. The solid materials in the materials system can be metallic or non-metallic (such as, but not limited to, solid solutions of non-metallic elements or compounds or ceramic materials or ceramic composite materials). Examples of solid materials for the materials system include, but are not limited to, chromium, chromium-bearing material, aluminum, aluminum-bearing material, silicon, silicon-bearing material, beryllium, beryllium-bearing material, nickel, nickel-bearing material, iron, iron-bearing material, cobalt, cobalt-bearing material, copper, copper-bearing material, manganese, manganese-bearing material, titanium, titanium-bearing material, zirconium, zirconium-bearing material, hafnium, hafnium-bearing material, tungsten, tungsten-bearing material, molybdenum, molybdenum-bearing material, niobium, niobium-bearing material, vanadium, vanadium-bearing material, tantalum, tantalum-bearing material, yttrium, and yttrium-bearing material. In the materials system described above, solid product material can be one or more materials taken from the group consisting of than one of $Cr_2O_3$, $Al_2O_3$, $SiO_2$, BeO, NiO, FeO, $Fe_3O_4$, $Fe_2O_3$, CoO, $Co_2O_3$, $Cu_2O$, MnO, $Mn_3O_4$, CuO, $TiO_x$ (with $0<x\leq2$), $ZrO_x$ (with $0<x\leq2$), $HfO_x$ (with $0<x\leq2$), $WO_x$ (where x can vary between 2.0 and 3.0), $MoO_x$ (where x can vary between 2.0 and 3.0), $NbO_x$ (with $0<x\leq2.5$), $VO_x$ (with $0<x\leq2.5$), $TaO_x$ (with $0<x\leq2.5$), and $YO_x$ (with $0<x\leq1.5$). In some embodiments of the materials system, the molten salt is a molten salt solution. A molten salt solution refers herein to a single liquid salt phase that contains more than one molten salt species (e.g., a homogeneous liquid solution of NaCl and KCl). Examples of such molten salt solutions include but are not limited to a molten NaCl-KCl solution and a molten $CaCl_2$-NaCl solution. In some embodiments of the materials system, method, the solid product can be non-metallic. In some embodiments, the solid product material is the non-metallic solid material itself or a constituent of the non-metallic solid material. In some embodiments of the materials system, the solid material can be non-metallic. Examples of solid materials of the materials system of this disclosure that are non-metallic include but are not limited an oxide, an oxide bearing solid solution or an oxide-bearing composite material. Examples of oxide materials that can comprise a solid material of this materials system can be, but not limited to, one or more of $Cr_2O_3$, $Al_2O_3$, $SiO_2$, BeO, NiO, FeO, $Fe_3O_4$, $Fe_2O_3$, CoO, $Co_2O_3$, $Cu_2O$, MnO, $Mn_3O_4$, CuO, $TiO_x$ (with $0<x\leq2$), $ZrO_x$ (with $0<x\leq2$), $HfO_x$ (with $0<x\leq2$), $WO_x$ (where x can vary between 2.0 and 3.0), $MoO_x$ (where x can vary between 2.0 and 3.0), $NbO_x$ (with $0<x\leq2.5$), $VO_x$ (with $0<x\leq2.5$), $TaO_x$ (with $0<x\leq2.5$), and $YO_x$ (with $0<x\leq1.5$).

It is yet another objective of this disclosure to describe a corrosion resistant device that can find applications where corrosion resistance to liquids is desired. On example of such an application is a heat transfer device where liquid flows through a heat exchanger or a heat-transfer device comprising a solid material. In such applications, the corrosion resistant device can comprise a solid-product layer, typically on the surface of a solid material, exposed to a liquid, wherein the concentration of the solid-product dissolved in the liquid is at saturation or at an elevated level. In some embodiments of the corrosion-resistant device, the solid product layer is on the surface of a solid material. In some embodiments of the corrosion-resistant device, the liquid is a molten salt. The solid materials in the corrosion-resistant device can be metallic or non-metallic (such as, but not limited to, solid solutions of non-metallic elements or compounds or ceramic materials or ceramic composite materials). Examples of solid materials for the corrosion resistant device include, but are not limited to, chromium, chromium-bearing material, aluminum, aluminum-bearing material, silicon, silicon-bearing material, beryllium, beryllium-bearing material, nickel, nickel-bearing material, iron, iron-bearing material, cobalt, cobalt-bearing material, copper, copper-bearing material, manganese, manganese-bearing material, titanium, titanium-bearing material, zirconium, zirconium-bearing material, hafnium, hafnium-bearing material, tungsten, tungsten-bearing material, molybdenum, molybdenum-bearing material, niobium, niobium-bearing material, vanadium, vanadium-bearing material, tantalum, tantalum-bearing material, yttrium, and yttrium-bearing material. In the corrosion resistant device described above, the solid product material can be one or more materials taken from the group consisting of than one of $Cr_2O_3$, $Al_2O_3$, $SiO_2$, $BeO$, $NiO$, $FeO$, $Fe_3O_4$, $Fe_2O_3$, $CoO$, $Co_2O_3$, $Cu_2O$, $MnO$, $Mn_3O_4$, $CuO$, $TiO_x$ (with $0<x\leq2$), $ZrO_x$ (with $0<x\leq2$), $HfO_x$ (with $0<x\leq2$), $WO_x$ (where x can vary between 2.0 and 3.0), $MoO_x$ (where x can vary between 2.0 and 3.0), $NbO_x$ (with $0<x\leq2.5$), $VO_x$ (with $0<x\leq2.5$), $TaO_x$ (with $0<x\leq2.5$), and $YO_x$ (with $0<x\leq1.5$).

In some embodiments of the corrosion resistant device, the molten salt is a molten salt solution. A molten salt solution refers herein to a single liquid salt phase that contains more than one molten salt species (e.g., a homogeneous liquid solution of NaCl and KCl). Examples of such molten salt solutions include but are not limited to a molten NaCl-KCl solution and a molten $CaCl_2$-NaCl solution. In some embodiments of the corrosion-resistant device, the solid product can be non-metallic. In some embodiments, the solid product material is the non-metallic solid material itself or a constituent of the non-metallic solid material. In some embodiments of the corrosion-resistant device, the solid material can be non-metallic Examples of solid materials of the corrosion-resistant devices of this disclosure that are non-metallic include but are not limited an oxide, an oxide bearing solid solution, or an oxide-bearing composite material. Examples of oxide materials that can comprise a solid material of this method can be, but not limited to, one or more of $Cr_2O_3$, $Al_2O_3$, $SiO_2$, $BeO$, $NiO$, $FeO$, $Fe_3O_4$, $Fe_2O_3$, $CoO$, $Co_2O_3$, $Cu_2O$, $MnO$, $Mn_3O_4$, $CuO$, $TiO_x$ (with $0<x\leq2$), $ZrO_x$ (with $0<x\leq2$), $HfO_x$ (with $0<x\leq2$), $WO_x$ (where x can vary between 2.0 and 3.0), $MoO_x$ (where x can vary between 2.0 and 3.0), $NbO_x$ (with $0<x\leq2.5$), $VO_x$ (with $0<x\leq2.5$), $TaO_x$ (with $0<x\leq2.5$), and $YO_x$ (with $0<x\leq1.5$).

It should be recognized that, in the methods, materials systems, and corrosion resistant devices of this disclosure, the solid materials whose resistance to corrosion in a liquid environment is desired to be enhanced can be a thermally conductive material.

It should be recognized that, in the methods, materials systems, and corrosion resistant devices of this disclosure, the solid materials whose resistance to corrosion in a liquid environment is desired to be enhanced can be a thermally insulating material.

It should be recognized that, in the methods, materials systems, and corrosion resistant devices of this disclosure, the non-metallic material can be one or more than one of a boride, a boride-bearing material, a carbide, a carbide-bearing material, a nitride, a nitride-bearing material, a sulfide, a sulfide-bearing material, an oxide, and an oxide-bearing material.

It should be recognized that, in the methods and materials systems of this disclosure, the solid product material can be an oxide of the non-metallic solid material or an oxide of a constituent of the non-metallic solid material.

It should be recognized that, in the methods and materials systems of this disclosure, the non-metallic material can be a composite material containing a mixture of two or more of a boride, a boride-bearing material, a carbide, a carbide-bearing material, a nitride, a nitride-bearing material, a sulfide, a sulfide-bearing material, an oxide, and an oxide-bearing material.

It should be recognized that, in the methods and materials systems of this disclosure, the non-metallic material can be an oxide solid solution containing two or more of a boride, a boride-bearing material, a carbide, a carbide-bearing material, a nitride, a nitride-bearing material, a sulfide, a sulfide-bearing material, an oxide, and an oxide-bearing material.

It should be recognized that in certain embodiments of the corrosion resistant device of this disclosure, that the device can be in contact with the molten salt and the device can be a container, a pipe, a valve, a pump, or a heat-transfer device.

The foregoing detailed description of the principles of this disclosure refers to molten salts and molten salt solutions. It should be recognized that the principles of the disclosure apply to molten salt mixtures as well. Molten salt mixtures comprise salts that are not mutually dissolvable in each other. Further when the solubility of one salt in another is exceeded in a molten salt solution, molten salt mixtures can result. Further some slurries are examples of molten salt mixtures.

While the present disclosure has been described with reference to certain embodiments, it will be apparent to those of ordinary skill in the art that other embodiments and implementations are possible that are within the scope of the present disclosure without departing from the spirit and scope of the present disclosure. For example, the components could be formed of materials other than those noted, and could be used in high-temperature applications other than those described. Accordingly, it should be understood that the disclosure is not limited to any embodiment described herein. It should also be understood that the phraseology and terminology employed above are for describing the disclosed embodiments, and do not necessarily serve as limitations to the scope of the disclosure.

The invention claimed is:

1. A method for enhancing corrosion resistance of a heat exchanger, pipe, valve, tank, pump, bearing, or engine component comprising a solid material exposed to a chloride-bearing liquid, the method comprising:
   providing the solid material whose corrosion resistance to the chloride-bearing liquid is desired to be enhanced, the solid material being capable of chemically reacting with a chemical element to form a solid product material that is resistant to corrosion by the chloride-bearing liquid;
   providing the chloride-bearing liquid consisting of a molten chloride salt or a solution of molten chloride salts;
   dissolving in the chloride-bearing liquid a dissolved concentration of the solid product material at an elevated concentration level of at least 1 wt % up to a saturation level of the solid product material in the chloride-bearing liquid;
   forming on a surface of the solid material a solid product layer that contains the solid product material by exposing the solid material to at least one of a gas containing the chemical element or to the chloride-bearing liquid further containing the chemical element; and using the heat exchanger, pipe, valve, tank, pump, bearing, heat sink, or engine component in an application in which a surface of the solid product layer contacts the chloride-bearing liquid containing the dissolved concentration of the solid product material, the dissolved concentration of the solid product material being maintained in the chloride-bearing liquid at the elevated concentration level, the dissolved concentration of the solid product material contained by the chloride-bearing liquid reducing a thermodynamic driving force for dissolution of the solid product material of the solid product layer.

2. The method of claim 1, wherein the solid material is a metallic material.

3. The method of claim 2, wherein the metallic material is one or more than one of chromium, chromium-bearing material, aluminum, aluminum-bearing material, silicon, silicon-bearing material, beryllium, beryllium-bearing material, nickel, nickel-bearing material, iron, iron-bearing material, cobalt, cobalt-bearing material, copper, copper-bearing material, manganese, manganese-bearing material, titanium, titanium-bearing material, zirconium, zirconium-bearing material, hafnium, hafnium-bearing material, tungsten, tungsten-bearing material, molybdenum, molybdenum-bearing material, niobium, niobium-bearing material, vanadium, vanadium-bearing material, tantalum, tantalum-bearing material, yttrium, and yttrium-bearing material.

4. The method of claim 1, wherein the solid product material is one or more than one of $Cr_2O_3$, $Al_2O_3$, $SiO_2$, BeO, NiO, FeO, $Fe_3O_4$, $Fe_2O_3$, CoO, $Co_2O_3$, $Cu_2O$, MnO, $Mn_3O_4$, CuO, $TiO_x$ (with $0<x\leq2$), $ZrO_x$ (with $0<x\leq2$), $HfO_x$ (with $0<x\leq2$), $WO_x$ (where x can vary between 2.0 and 3.0), $MoO_x$ (where x can vary between 2.0 and 3.0), $NbO_x$ (with $0<x\leq2.5$), $VO_x$ (with $0<x\leq2.5$), $TaO_x$ (with $0<x\leq2.5$), and $YO_x$ (with $0<x\leq1.5$).

5. The method of claim 1, wherein the chloride-bearing liquid is the solution of molten chloride salts, and the solution of molten chloride salts is one of a molten NaCl-bearing solution, a molten KCl-bearing solution, and a molten $CaCl_2$-bearing solution.

6. The method of claim 1, wherein the solid material is non-metallic.

7. The method of claim 6, wherein the solid product material is an oxide of the non-metallic solid material or an oxide of a constituent of the non-metallic solid material.

8. The method of claim 7, wherein the oxide is one or more of $Cr_2O_3$, $Al_2O_3$, $SiO_2$, BeO, NiO, FeO, $Fe_3O_4$, $Fe_2O_3$, CoO, $Co_2O_3$, $Cu_2O$, MnO, $Mn_3O_4$, CuO, $TiO_x$ (with $0<x\leq2$), $ZrO_x$ (with $0<x\leq2$), $HfO_x$ (with $0<x\leq2$), $WO_x$ (where x can vary between 2.0 and 3.0), $MoO_x$ (where x can vary between 2.0 and 3.0), $NbO_x$ (with $0<x\leq2.5$), $VO_x$ (with $0<x\leq2.5$), $TaO_x$ (with $0<x\leq2.5$), and $YO_x$ (with $0<x\leq1.5$).

9. The method of claim 6, wherein the non-metallic material is one or more than one of a boride, a boride-bearing material, a carbide, a carbide-bearing material, a nitride, a nitride-bearing material, a sulfide, a sulfide-bearing material, an oxide, and an oxide-bearing material.

10. The method of claim 6, wherein the chloride-bearing liquid is the solution of molten chloride salts, and the solution of molten chloride salts is one of a molten NaCl-bearing solution, a molten KCl-bearing solution, and a molten $CaCl_2$-bearing solution.

11. The method of claim 1, wherein the forming of the solid product layer on the surface of the solid material comprises contacting the surface of the solid material with the gas containing the chemical element.

12. The method of claim 1, wherein the forming of the solid product layer on the surface of the solid material comprises contacting the surface of the solid material with the chloride-bearing liquid containing the chemical element.

13. The method of claim 1, wherein the chemical element is at least one of oxygen and water.

14. The method of claim 13, wherein the solid product layer consists of the solid product material, and the solid product material is an oxide of a metal constituent of the solid material.

15. The method of claim 1, the method further comprising adding to the chloride-bearing liquid an additive other than the solid product material, the additive reducing the solubility of the solid product material in the chloride-bearing liquid.

16. The method of claim 15, wherein the additive is an oxide.

* * * * *